United States Patent
Zhou

(10) Patent No.: US 11,337,223 B2
(45) Date of Patent: May 17, 2022

(54) METHOD AND BASE STATION FOR AVOIDING INTER-CELL INTERFERENCE

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 256 days.

(21) Appl. No.: 16/642,301

(22) PCT Filed: Sep. 7, 2017

(86) PCT No.: PCT/CN2017/100809
§ 371 (c)(1),
(2) Date: Feb. 26, 2020

(87) PCT Pub. No.: WO2019/047085
PCT Pub. Date: Mar. 14, 2019

(65) Prior Publication Data
US 2020/0205161 A1 Jun. 25, 2020

(51) Int. Cl.
*H04W 4/00* (2018.01)
*H04W 72/08* (2009.01)
(Continued)

(52) U.S. Cl.
CPC ......... *H04W 72/082* (2013.01); *H04L 5/0053* (2013.01); *H04L 5/0073* (2013.01);
(Continued)

(58) Field of Classification Search
CPC ........... H04W 72/002; H04W 72/0446; H04W 72/0453; H04W 72/082; H04L 5/0053; H04L 5/0073; H04L 5/14
(Continued)

(56) References Cited

U.S. PATENT DOCUMENTS 8,086,180 B2 * 12/2011 Chiu .................. H04W 16/12
455/63.1
8,861,425 B2 10/2014 Takano
(Continued)

FOREIGN PATENT DOCUMENTS

CN 103563478 A 2/2014
CN 103931258 A 7/2014
(Continued)

OTHER PUBLICATIONS

International Search Report in the International Application No. PCT/CN2017/100809, dated May 31, 2018.
(Continued)

*Primary Examiner* — Thai D Hoang
(74) *Attorney, Agent, or Firm* — Finnegan, Henderson, Farabow, Garrett & Dunner, L.L.P.

(57) ABSTRACT

Provided are a method and base station for avoiding inter-cell interference. The method includes: determining a target time period when inter-cell interference may occur; adjusting a time-frequency resource range allocated individually by base stations based on a target band width part (BWP) to target user equipment (UE) in the target time period to determine a reallocated time-frequency resource range, the base stations including a first base station and a second base station involved in the inter-cell interference, the second base station being adjacent to the first base station; determining target scheduling-configuration information for avoiding the inter-cell interference according to the reallocated time-frequency resource range; and scheduling first target UE on the target BWP according to the target scheduling-configuration information. With the method for avoiding inter-cell interference, the inter-cell interference can be effectively reduced or eliminated, and user experience of a 5G network device can be improved.

20 Claims, 22 Drawing Sheets

(51) Int. Cl.
  *H04L 5/00* (2006.01)
  *H04L 5/14* (2006.01)
  *H04W 72/04* (2009.01)
  *H04W 74/00* (2009.01)
(52) U.S. Cl.
  CPC ........... *H04L 5/14* (2013.01); *H04W 72/0446* (2013.01); *H04W 72/0453* (2013.01); *H04W 74/002* (2013.01)
(58) Field of Classification Search
  USPC ................................. 370/329–330, 335–345
  See application file for complete search history.

(56) References Cited

U.S. PATENT DOCUMENTS

| | | | |
|---|---|---|---|
| 2009/0247166 A1 | 10/2009 | Luo et al. | |
| 2010/0085881 A1* | 4/2010 | Tanigawa | H04L 5/0053 370/252 |
| 2010/0118800 A1* | 5/2010 | Kim | H04L 1/0071 370/329 |
| 2012/0120893 A1* | 5/2012 | Baligh | H04W 24/02 370/329 |
| 2012/0140702 A1 | 6/2012 | Takano | |
| 2013/0121186 A1 | 5/2013 | Vajapeyam et al. | |
| 2013/0242927 A1 | 9/2013 | Luo et al. | |
| 2013/0315193 A1* | 11/2013 | Kim | H04L 1/1858 370/329 |
| 2013/0322323 A1 | 12/2013 | Kim et al. | |
| 2014/0044095 A1 | 2/2014 | Li et al. | |
| 2014/0148172 A1* | 5/2014 | Brisebois | H04W 16/14 455/438 |
| 2014/0376449 A1 | 12/2014 | Takano | |
| 2016/0029277 A1 | 1/2016 | Li et al. | |
| 2016/0309476 A1 | 10/2016 | Madan et al. | |
| 2017/0245283 A1* | 8/2017 | Garcia | H04W 72/0446 |
| 2018/0288783 A1* | 10/2018 | Li | H04W 24/02 |
| 2019/0364449 A1* | 11/2019 | Yang | H04W 72/0446 |
| 2020/0083925 A1* | 3/2020 | Zhou | H04L 5/003 |
| 2020/0120678 A1* | 4/2020 | Zhou | H04W 72/042 |
| 2020/0229210 A1* | 7/2020 | Bharadwaj | H04L 5/0064 |

FOREIGN PATENT DOCUMENTS

| | | |
|---|---|---|
| CN | 104170510 A | 11/2014 |
| CN | 104703201 A | 6/2015 |
| CN | 106230542 A | 12/2016 |
| EP | 2468056 A1 | 6/2012 |
| WO | WO 2009/121010 A2 | 10/2009 |

OTHER PUBLICATIONS

English Translation of the Written Opinion of the International Search Authority in the International Application No. PCT/CN2017/100809, dated May 31, 2018.

Interdigital, Inc., Bandwidth Adaptation via BWP Selection in NR, 3GPP TSG RAN WG1 NR Ad-Hoc #2, R1-1710878, Qingdao, China, Jun. 27-30, 2017, 3 pages.

Supplementary European Search Report in the European Application No. 17924215.1, dated Jul. 15, 2020.

First Office Action of the Chinese Application No. 201780001096.5, dated Jul. 31, 2020.

Examination Report of Indian Application No. 202047015053, dated Nov. 10, 2021.

* cited by examiner

US 11,337,223 B2

METHOD AND BASE STATION FOR AVOIDING INTER-CELL INTERFERENCE

CROSS REFERENCE TO RELATED APPLICATIONS

This application is a national phase application based on PCT/CN2017/100809, filed Sep. 7, 2017, the content of which is incorporated herein by reference.

TECHNICAL FIELD

The present disclosure generally relates to the technical field of communication, and more particularly, to a method and base station for avoiding inter-cell interference.

BACKGROUND

5th-Generation (5G) New Radio (NR) may be deployed in a high-frequency interval from 3.3 GHz to 24 GHz, and thus each carrier frequency range in a 5G NR system may be much wider than each carrier frequency range in a 4th-Generation (4G) Long Term Evolution (LTE) system. In a 5G network, a bandwidth of a single band can be close to 1 GHz, and a bandwidth of a single carrier can be between 80 MHz to 400 MHz. Considering energy conservation of user equipment (UE) and other aspects in a 5G network, a single carrier may be divided into multiple band width parts (BWPs). A base station may schedule a UE on one or more BWPs.

When adjacent base stations simultaneously schedule UEs by use of BWPs with the same frequency range, there may be inter-cell interference which includes interference between the adjacent base stations and interference between UEs in different cells that are very close and are under signal coverage of the base stations. This phenomenon often occurs particularly when uplink-to-downlink time-domain resource ratios of the adjacent base stations are out of synchronization in a Time Division Duplexing (TDD) mode. For example, as shown in FIG. 1, a first base station 100 may schedule, through a BWP, a first UE such as UE1 at a border of cell A covered by the base station 100, and a second base station 200 may schedule, through the same BWP, a second UE such as UE2 in a region, adjacent to the border of the cell A, in a cell B covered by the base station 200. In such a case, if the first base station schedules the first UE for downlink transmission and the second base station simultaneously schedules the second UE for uplink transmission, uplink transmission of the second UE may interfere with downlink transmission of the first UE, and downlink transmission of the first base station may also interfere with uplink transmission of the second base station.

In related art, such inter-cell interference can be avoided by inter-frequency networking, namely adjacent base stations may be instructed to schedule, through different BWPs, UEs in regions where interference may occur. However, in such a manner, part of frequency resources cannot be effectively used, and precious frequency resources may be wasted.

SUMMARY

For solving the problem in the related art, embodiments of the present disclosure provide a method and a base station for avoiding inter-cell interference, to reduce or eliminate inter-cell interference.

According to a first aspect of the embodiments of the present disclosure, a method for avoiding inter-cell interference is provided, which may be applied to a first base station, the method may include that:

a target time period when inter-cell interference may occur is determined;

a time-frequency resource range allocated to a target UE individually by base stations based on a target BWP in the target time period is adjusted to determine a reallocated time-frequency resource range, the base stations including the first base station and second base station involved in the inter-cell interference, the second base station being adjacent to the first base station;

target scheduling-configuration information for avoiding the inter-cell interference is determined according to the reallocated time-frequency resource range; and first target UE is scheduled on the target BWP according to the target scheduling-configuration information.

Optionally, the operation that the target time period when the inter-cell interference may occur is determined may include that:

uplink-to-downlink time-domain resource information of the second base station in a TDD mode is acquired; and the target tune period when the inter-cell interference may occur is determined according to uplink-to-downlink time-domain resource ratio information of the first base station and the uplink-to-downlink time-domain resource ratio information of the second base station in the TDD mode.

Optionally, the operation that the time-frequency resource range allocated individually by the base stations based on the target BWP to the target UE in the target time period is adjusted to determine the reallocated time-frequency resource range may include that;

first planned scheduling-configuration information of the first base station is determined, the first planned scheduling-configuration information including a first time-frequency resource range planned to be allocated to the first target UE by the first base station on the target BWP in the target time period;

second planned scheduling-configuration information of the second base station is acquired, the second planned scheduling-configuration information including a second time-frequency resource range planned to be allocated to second target UE by the second base station on the target BWP in the target time period;

whether the inter-cell interference is about to occur in the target time period or not is determined according to the first planned scheduling-configuration information and the second planned scheduling-configuration information; and under a circumstance that the inter-cell interference is about to occur, the time-frequency resource range allocated to the corresponding target UE individually by base stations on the target BWP is adjusted to determine the reallocated time-frequency resource range.

Optionally, the first time-frequency resource range may include a first frequency resource range and a first time-domain resource range, the second time-frequency resource range may include a second frequency resource range and a second time-domain resource range, and the operation that whether the inter-cell interference is about to occur in the target time period or not is determined according to the first planned scheduling-configuration information and the second planned scheduling-configuration information may include any one of:

in a case that the first frequency resource range allocated to the first target UE by the first base station on the target BWP partially overlaps the second frequency resource range allocated to the second target UE by the second base station on the target BWP, it is determined that the inter-cell interference is about to occur in the target time period; and in a case that the first time-domain resource range t1 allocated to the first target UE by the first base station in a preset frequency range of the target BWP and the second time-domain resource range t2 allocated to the second UE by the second base station in the same frequency range of the target BWP meet t1+t2>T, T being a time length of the target time period, it is determined that the inter-cell interference is about to occur in the target time period.

Optionally, the operation that the time-frequency resource range allocated to the corresponding target UE individually by base stations on the target BWP is adjusted may include that:

a reference time-frequency range is determined based on the first planned scheduling-configuration information;

first adjustment instruction information is generated according to the reference time-frequency range; and the first adjustment instruction information is sent to the second base station to enable the second base station to perform time-frequency range adjustment based on the reference time-frequency range.

Optionally, the operation that the reference time-frequency range is determined based on the first planned scheduling-configuration information may include that:

the first time-frequency resource range is adjusted to obtain a first reallocated time-frequency resource range; and the first reallocated time-frequency resource range is determined as the reference time-frequency range; or, the first time-frequency resource range is determined as the reference time-frequency range.

Optionally, the operation that the time-frequency resource range allocated to the corresponding target UE individually by base stations on the target BWP is adjusted may include that:

second adjustment instruction information sent by the second base station is received; and the time-frequency resource range allocated to the first target UE is adjusted according to the second adjustment instruction information and based on a reference time-frequency range determined by the second base station.

Optionally, the reference time-frequency range determined by the second base station may include: the second time-frequency resource range; or, a second reallocated time-frequency resource range determined after the second base station adjusts the second time-frequency resource range.

Optionally, the operation that the time-frequency resource range allocated to the corresponding target UE individually by base stations on the target BWP is adjusted may include that:

the first time-frequency resource range is adjusted according to a preset adjustment manner to obtain the reallocated time-frequency resource range.

Optionally, the operation that the target scheduling-configuration information for avoiding the inter-cell interference is determined according to the reallocated time-frequency resource range may include that:

the reallocated time-frequency resource range, determined through a time-frequency resource adjustment by the first base station, is sent to the second base station;

preset feedback information of the second base station is received, the preset feedback information indicating whether the second base station supports the reallocated time-frequency resource range determined by the first base station or not; and in a case that the preset feedback information indicates that the second base station supports the reallocated time-frequency resource range determined by the first base station, the target scheduling-configuration information is determined according to the reallocated time-frequency resource range.

Optionally, the target scheduling-configuration information may include reallocated time-frequency resource ranges corresponding to different time ranges in the target time period and determined according to different adjustment manners, and the different adjustment manners may include a frequency adjustment manner and a time-domain adjustment manner.

According to a second aspect of the embodiments of the present disclosure, a base station for avoiding inter-cell interference is provided, which may include:

an interference time period determination module, configured to determine a target time period when the inter-cell interference may occur;

an adjustment module, configured to adjust a time-frequency resource range allocated individually by base stations based on a target BWP to a target UE in the target time period to determine a reallocated time-frequency resource range, the base stations including a first base station and a second base station involved in the inter-cell interference, the second base station being adjacent to the first base station;

a target configuration determination module, configured to determine target scheduling-configuration information for avoiding the inter-cell interference according to the reallocated time-frequency resource range; and a scheduling module, configured to schedule first target UE on the target BWP according to the target scheduling-configuration information.

Optionally, the interference time period determination module may include:

a resource ratio acquisition submodule, configured to acquire uplink-to-downlink time-domain resource ratio information of the second base station in a TDD mode; and a target time period determination submodule, configured to determine the target time period when the inter-cell interference may occur according to uplink-to-downlink time-domain resource ratio information of the first base station and the uplink-to-downlink time-domain resource ratio information of the second base station in the TDD mode.

Optionally, the adjustment module may include:

a first planned configuration determination submodule, configured to determine first planned scheduling-configuration information of the first base station, the first planned scheduling-configuration information including a first time-frequency resource range planned to be allocated to the first target UE by the first base station on the target BWP in the target time period;

a second planned configuration determination submodule, configured to acquire second planned scheduling-configuration information of the second base station, the second planned scheduling-configuration information including a second time-frequency resource range planned to be allocated to second target UE by the second base station on the target. BWP in the target time period;

an interference determination submodule, configured to determine whether the inter-cell interference is about to occur in the target time period or not according to the first planned scheduling-configuration information and the second planned scheduling-configuration information; and a resource range adjustment submodule, configured to, under a circumstance that the inter-cell interference is about to occur, adjust the time-frequency resource range allocated individually by the base stations on the target BWP to the corresponding target UE to determine the reallocated time-frequency resource range.

Optionally, the first time-frequency resource range determined by the first planned configuration determination submodule may include a first frequency resource range and a first time-domain resource range, the second time-frequency resource range determined by the second planned configuration determination submodule may include a second frequency resource range and a second time-domain resource range, and the interference determination submodule may include any one of the following units:

a first interference determination unit, configured to, in a case that the first frequency resource range allocated to the first target UE by the first base station on the target BWP partially overlaps the second frequency resource range allocated to the second target UE by the second base station on the target BWP, determine that the inter-cell interference is about to occur in the target time period; and a second interference determination module, configured to, in a case that the first time-domain resource range t1 allocated to the first target UE by the first base station in a preset frequency range of the target BWP and the second time-domain resource range t2 allocated to the second UE by the second base station in the same frequency range of the target BWP meet t1+t2>T, T being a time length of the target time period, determine that the inter-cell interference is about to occur in the target time period.

Optionally, the resource range adjustment submodule may include:

a first reference time-frequency determination unit, configured to determine a reference time-frequency range based on the first planned scheduling-configuration information;

a first instruction generation unit, configured to generate first adjustment instruction information according to the reference time-frequency range; and a first instruction sending unit, configured to send the first adjustment instruction information to the second base station to enable the second base station to perform time-frequency range adjustment based on the reference time-frequency range.

Optionally, the first reference time-frequency determination unit may include:

an active adjustment subunit, configured to adjust the first time-frequency resource range to obtain a first reallocated time-frequency resource range and a first determination subunit, configured to determine the first reallocated time-frequency resource range as the reference time-frequency range; or, a second determination subunit, configured to determine the first time-frequency resource range as the reference time-frequency range.

Optionally, the resource range adjustment submodule may include:

a second instruction receiving unit, configured to receive second adjustment instruction information from the second base station; and a passive adjustment unit, configured to adjust, according to the second adjustment instruction information and based on a reference time-frequency range determined by the second base station, the time-frequency resource range allocated to the first target UE.

Optionally, the reference time-frequency range determined by the second base station may include: the second time-frequency resource range; or, a second reallocated time-frequency resource range determined after the second base station adjusts the second time-frequency resource range.

Optionally, the resource range adjustment submodule may be configured to adjust the first time-frequency resource range according to a preset adjustment manner to obtain the reallocated time-frequency resource range.

Optionally, the target configuration determination module may include:

a reallocated resource range sending submodule, configured to send the reallocated time-frequency resource range, determined through a time-frequency resource adjustment by the first base station, to the second base station;

a feedback information receiving submodule, configured to receive preset feedback information from the second base station, the preset feedback information indicating whether the second base station supports the reallocated time-frequency resource range determined by the first base station or not; and a target configuration determination submodule, configured to, in a case that the preset feedback information indicates that the second base station supports the reallocated time-frequency resource range determined by the first base station, determine the target scheduling-configuration information according to the reallocated time-frequency resource range.

Optionally, the target scheduling-configuration information determined by the target configuration determination module may include reallocated time-frequency resource ranges corresponding to different time ranges in the target time period and determined according to different adjustment manners, and the different adjustment manners may include a frequency adjustment manner and a time-domain adjustment manner.

According to a third aspect of the embodiments of the present disclosure, a non-transitory computer-readable storage medium is provided, which has a computer instruction stored thereon that, when executed by a processor, can implement the steps of any method of the first aspect.

According to a fourth aspect of the embodiments of the present disclosure, a base station is provided, which may include: a processor; and a memory configured to store an instruction executable by the processor. The processor may be configured to:

determine a target time period when inter-cell interference may occur;

adjust a time-frequency resource range allocated individually by base stations based on a target BWP to a target UE in the target time period to determine target scheduling-configuration information for avoiding the inter-cell interference, the base stations including the first base station and second base station involved in the inter-cell interference, the second base station being adjacent to the first base station and schedule first target UE on the target BWP according to the target scheduling-configuration information.

The technical solutions provided in the embodiments of the present disclosure have the following beneficial effects.

In the embodiments of the present disclosure, when adjacent base stations plan to schedule UEs at edges of adjacent cells on a target BWP of the same frequency range, for reducing or eliminating inter-cell interference, a target time period when inter-cell interference may occur may be determined, then a time-frequency resource range allocated to a target UE individually by base stations based on the target BWP in the target time period may be adjusted, target scheduling-configuration information for avoiding the inter-cell interference may be determined according to the adjusted time-frequency resource range, then the target scheduling-configuration information may be sent to the corresponding target UE for transmission configuration of the target UE, and after the target UE completes transmission configuration, the first base station may allocate a time-frequency resource to the first target UE for information transmission on the target BWP according to the scheduling-configuration information for the first target UE. Since a time-domain resource range or a frequency resource range allocated to the target UE individually by base stations is avoided from being overlapped as much as possible in a time-frequency resource range adjustment process, when the target UEs at the edges of the adjacent cells transmit information by use of different time-frequency resources in the same target BWP, the inter-cell interference may be effectively reduced or eliminated, the communication quality and performance of the UE at the edges of the cells may be improved, and a user experience of a 5G network device may be improved.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 4-1 is a schematic diagram illustrating a target time period according to an exemplary embodiment of the present disclosure.

FIG. 4-2 is another schematic diagram illustrating inter-cell interference avoidance according to an exemplary embodiment of the present disclosure.

FIG. 4-3 is another schematic diagram illustrating inter-cell interference avoidance according to an exemplary embodiment of the present disclosure.

FIG. 4-4 is another schematic diagram illustrating inter-cell interference avoidance according to an exemplary embodiment of the present disclosure.

FIG. 4-5 is another schematic diagram illustrating inter-cell interference avoidance according to an exemplary embodiment of the present disclosure.

FIG. 5 is a flowchart showing another method for avoiding inter-cell interference according to an exemplary embodiment of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Execution bodies involved in the embodiments of the present disclosure include a first base station and a second base station, and the second base station is adjacent to the first base station. Any one of the base stations may be a macro base station or a micro base station with relatively small signal coverage. The macro base station may be a base station, a sub base station and the like with massive antenna arrays. The micro base station may be a micro base station, a pico base station, a femto base station and the like. In a specific implementation process, the first base station and the second base station may be independent of each other and may communicate with each other to implement the technical solutions provided in the present disclosure together.

In the present disclosure, there may be more than one base station having inter-cell interference with a base station. For convenient description in the embodiments of the present disclosure, descriptions are made with the condition that there is only one related base station as an example, which should not be understood as a limit to the present disclosure.

Figure 2:
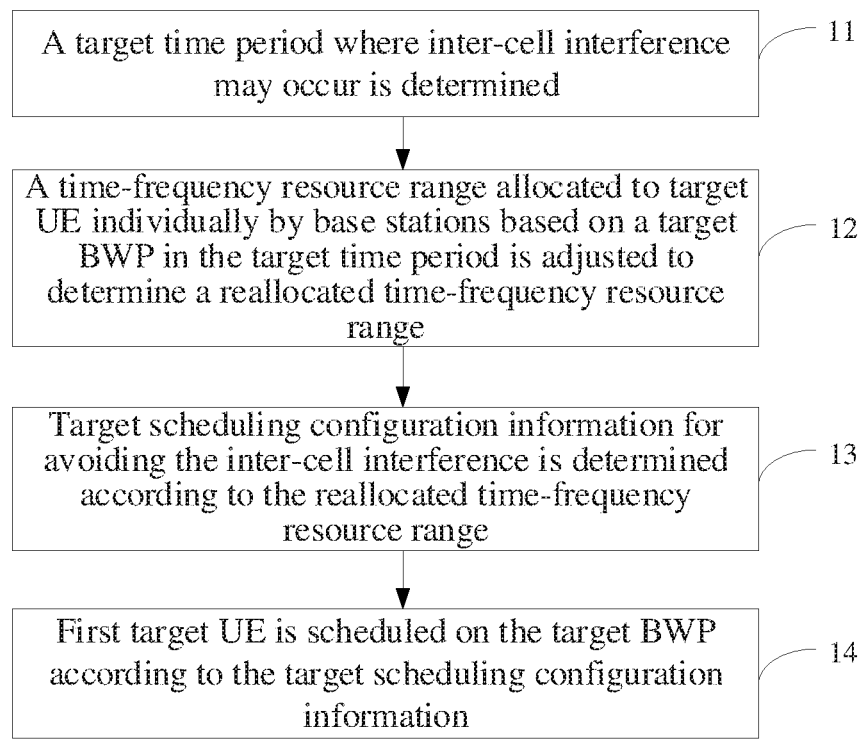
FIG. 2 is a flowchart showing a method for avoiding inter-cell interference according to an exemplary embodiment of the present disclosure.

FIG. 2 is a flowchart showing a method for avoiding inter-cell interference according to an exemplary embodiment. The method may be applied to a first base station and may include the following steps.

In Step 11, a target time period when inter cell interference may occur is determined.

For example, each base station may be in a TDD mode. When uplink-to-downlink time-domain resource ratios of adjacent base stations are out of synchronization, a target time period when inter-cell interference may occur between UEs at edges of adjacent cells under coverage of different base stations may be determined according to a time-domain resource ratio relationship between the base stations. The base stations may include the first base station and the second base station involved in the inter-cell interference, and the second base station being adjacent to the first base station.

Figure 1:
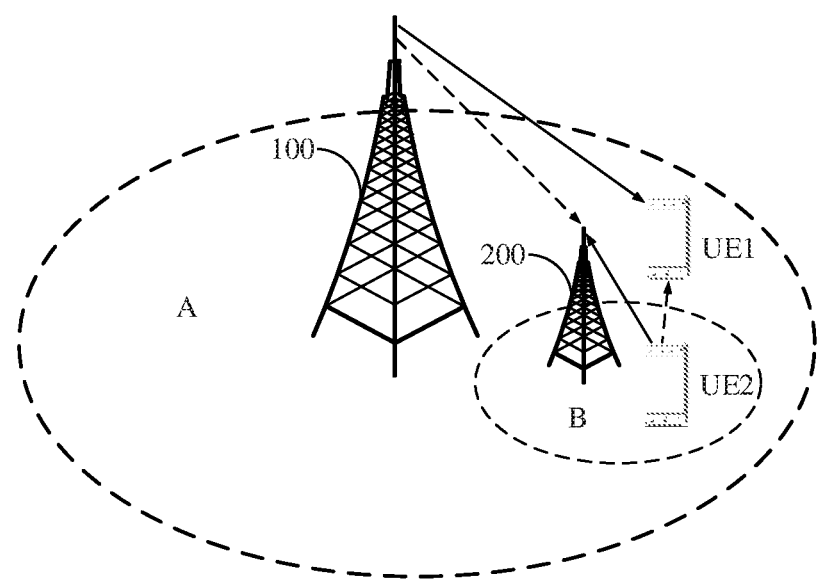
FIG. 1 is a schematic diagram illustrating inter-cell interference according to an exemplary embodiment.

In the embodiment of the present disclosure, it is assumed that the first base station is a macro base station 100 in FIG. 1 and the second base station is a micro base station 200 closest to the first base station. The first base station may determine, according to an uplink-to-downlink time-domain resource ratio of the first base station and an uplink-to-downlink time-domain resource ratio of the second base station, a target time period when inter-cell interference may occur, when the first base station and the second base station schedule UEs by use of the same BWP respectively.

Figure 3:
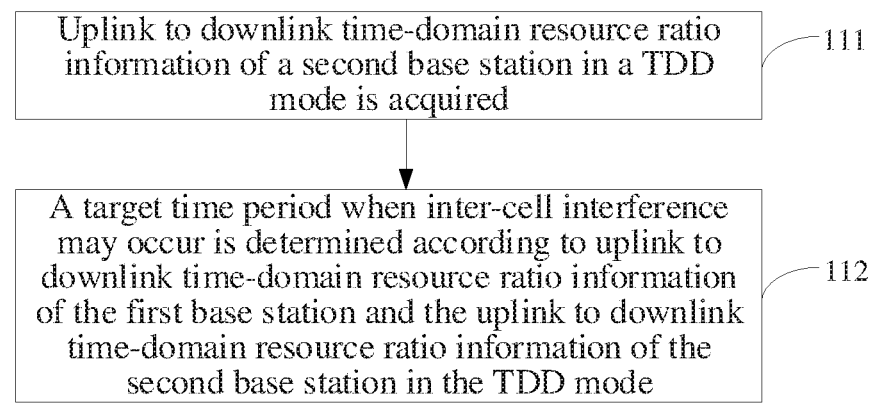
FIG. 3 is a flowchart showing another method for avoiding inter-cell interference according to an exemplary embodiment of the present disclosure.

FIG. 3 is a flowchart showing a method for avoiding inter-cell interference according to an exemplary embodiment. Step 11 may include the following operations.

In Step 111, uplink-to-downlink time-domain resource ratio information of a second base station in a TDD mode is acquired.

In the present disclosure, a configured unit tune-domain resource may be a subframe, a slot, a mini slot, a symbol and die like.

In the embodiment of the present disclosure, depending on whether the base stations can directly perform information interaction or not, there may be two conditions for implementing Step 111.

A first condition may be that: in a case that both the first base station and the second base station are provided with preset base-station interaction interfaces and the interface such as an X2 interface may be configured for direct information interaction between the base stations, the first base station may acquire the uplink-to-downlink time-domain resource ratio information configured by the second base station through the preset base-station interaction interface.

A second condition may be that: in a case that the first base station or the second base station is not provided with any interface for direct information interaction between the base stations, the first base station may indirectly acquire uplink-to-downlink time-domain resource ratio information of the second base station, for example, indirectly acquiring the uplink-to-downlink time-domain resource ratio information of the second base station through a Mobility Management Entity (MME).

In Step 112, the target time period when inter-cell interference may occur is determined according to uplink-to-downlink time-domain resource ratio information of the first base station and the uplink-to-downlink time-domain resource ratio information of the second base station in the TDD mode.

In the present disclosure, in a case that transmission configuration information of the first base station for a cell where first target UE is located is different from transmission configuration information of the second base station for a cell where second target UE is located, namely uplink-to-downlink tune-domain resource ratios of the two cells are different, the time period when the inter-cell interference may occur in the same time range may be determined according to time-domain resource ratio conditions of the two cells.

Figures 1, 4:
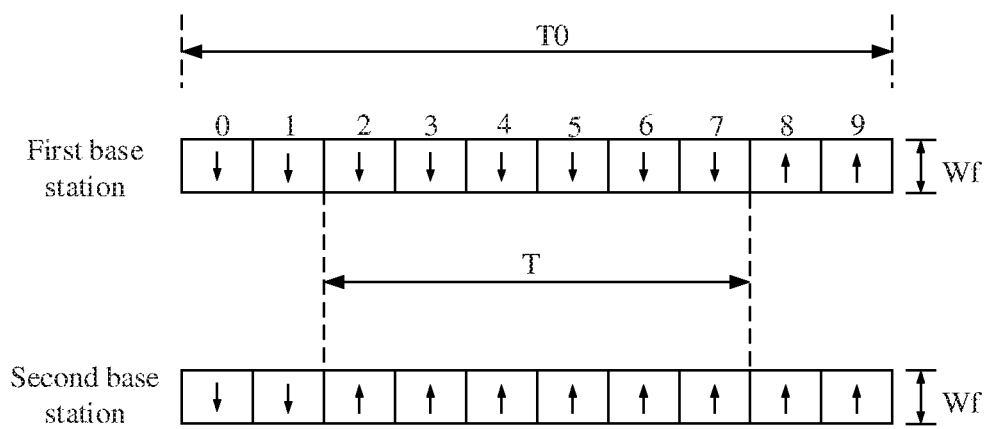
Figures 2, 4:
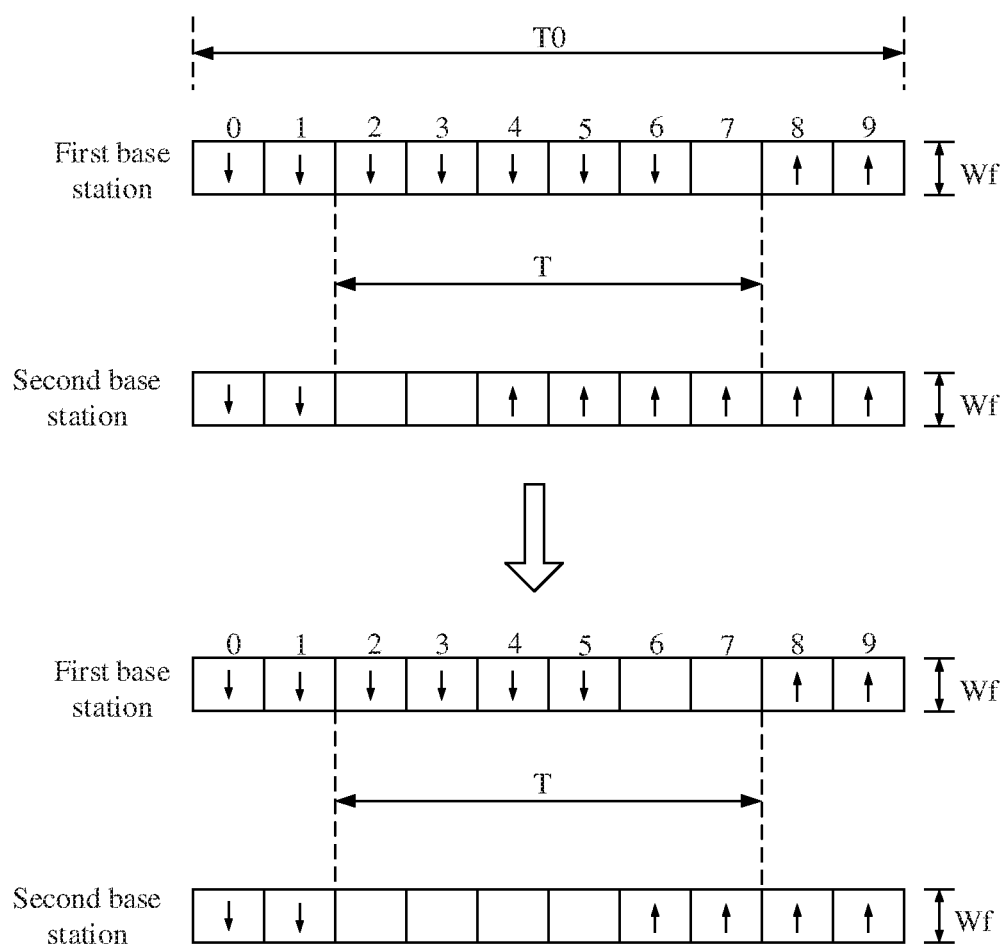
Figures 3, 4:
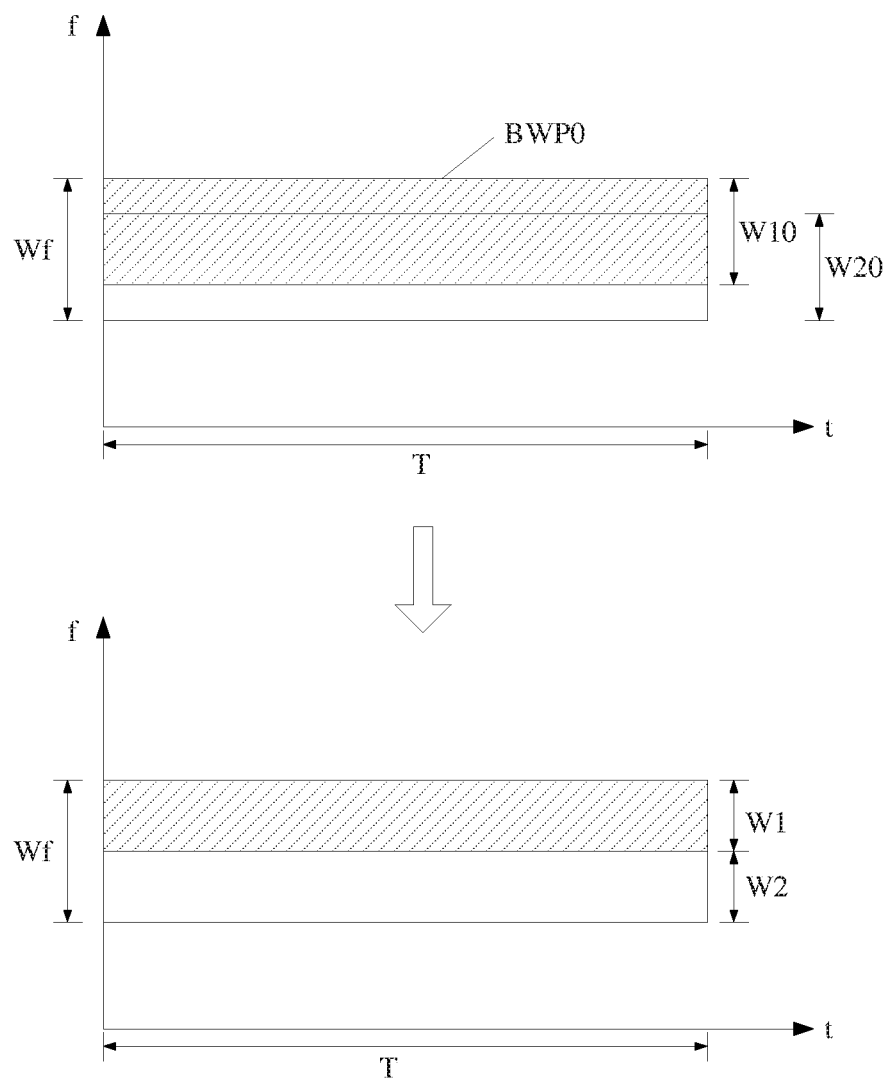
Figure 4:
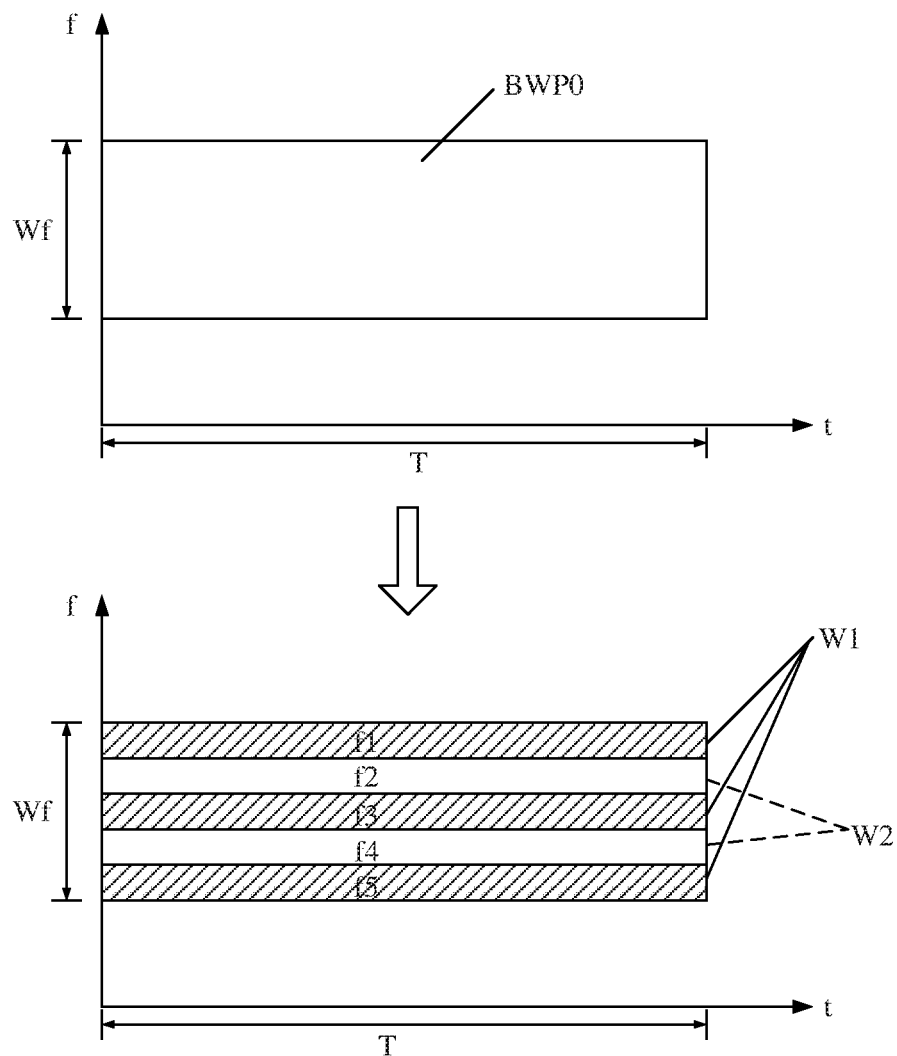

FIG. 4-1 is a schematic diagram illustrating a target time period according to an exemplary embodiment. For example, in a time range T0 with a time length of 10 ms, if an uplink-to-downlink time-domain resource ratio of the first base station is 8:2, namely 8 ms downlink and 2 ms uplink are configured in the time range T0, and an uplink-to-downlink time-domain resource ratio of the second base station is 2:8, namely 2 ms downlink and 8 ms uplink are configured in the time range T0, then a Ems interference time period may exist therebetween; and if 10 unit time-domain resources in the time range T0 are represented with labels 0 to 9, a 6 ms time range corresponding to the unit time-domain resources 2 to 7 may be the target time period when the inter-cell interference may occur.

In the example shown in FIG. 4-1, the time range T0 may represent a frame of art LTE, and in such a case, any unit time-domain resource represented with the labels 0 to 9 may be a subframe.

It can be learned that, in a 5G NR system, the time range T0 may be a Transmission Time Interval (TTI), and the unit time-domain resource may be a slot, a mini slot, a symbol and the like.

In the embodiment of the present disclosure, for the condition that uplink-to-downlink time-domain resource ratios of different base stations in the same time range are out of synchronization, a target time period when inter-cell interference may occur in the same time range may be accurately determined in a full-frequency range simply through uplink-to-downlink ratio information and labels of unit time-domain resources in the time range.

In Step 12, a time-frequency resource range allocated to a target UE by each base station based on a target BWP in the target time period is adjusted to determine a reallocated time-frequency resource range.

As mentioned above, the base stations may include the first base station and second base station involved in the inter-cell interference, and the second base station is adjacent to the first base station.

In the present disclosure, the target UE may be a UE in an adjacent cell covered by an adjacent base station respectively, and the number of target UE to which inter-cell interference may occur in each cell may be more than or equal to 1. For convenient description in the embodiment of the present disclosure, descriptions are made with the condition that there is one target UE in each cell, for example, UE1 and UE2 in FIG. 1, which should not be understood as a limit to the present disclosure. The UE may be a user terminal, a user node, a mobile terminal, a wearable device, a tablet computer or the like.

In the present disclosure, a condition for possible occurrence of the inter-cell interference may be that adjacent base stations schedule UEs at edges of adjacent cells in the target time period on a BWP of the same frequency range respectively.

Figures 4, 5:
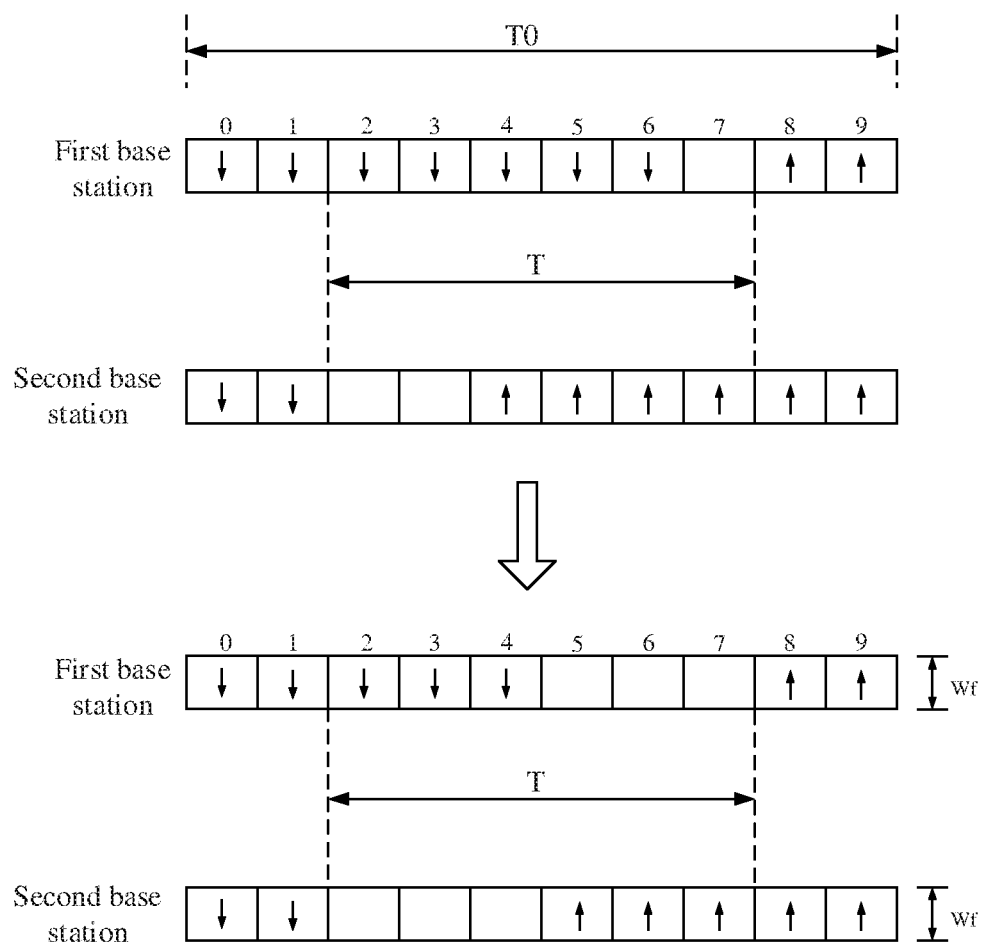
Figure 5:
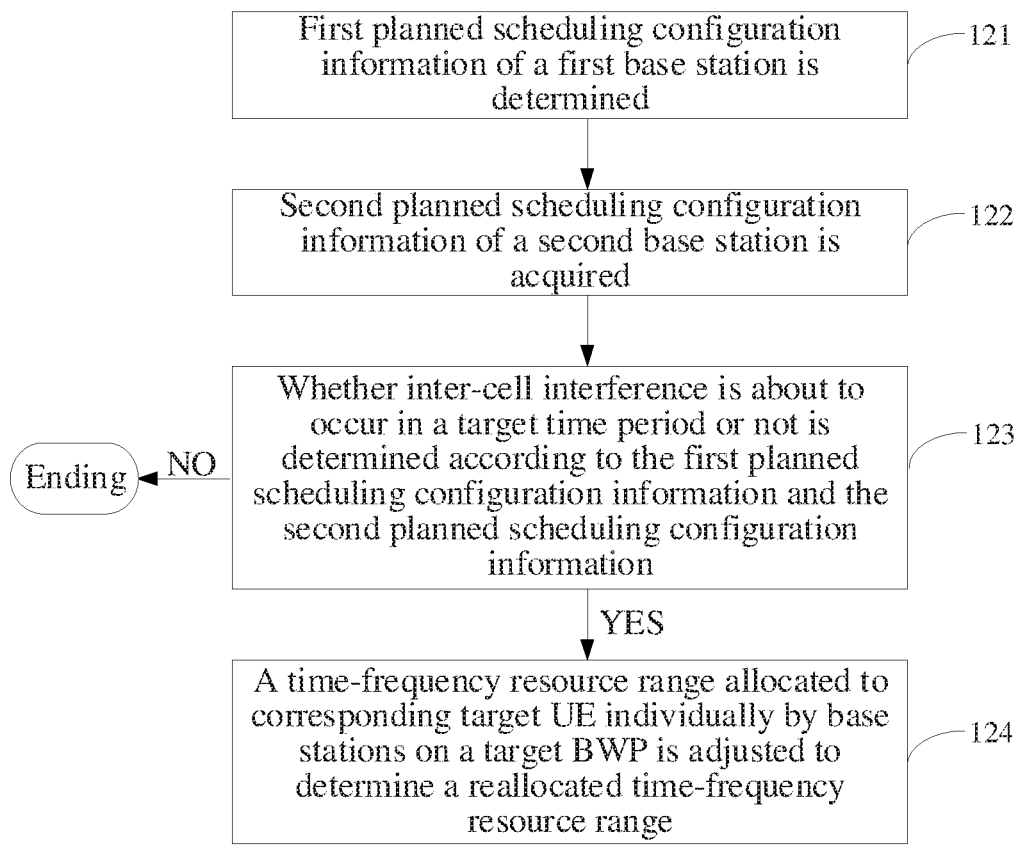

Based on this, FIG. 5 is a flowchart showing another method for avoiding inter-cell interference according to an exemplary embodiment. Step 12 may include the following operations.

In Step 121, first planned scheduling-configuration information of the first base station is determined, the first planned scheduling-configuration information including a first time-frequency resource range planned to be allocated to first target UE by the first base station on the target BWP in the target time period.

In the present disclosure, the first time-frequency resource range may include a first time-domain resource range and a first frequency resource range. The first time-domain resource range may be a time-domain resource range planned to be allocated to the first target UE by the first base station on the target BWP in the target time period.

The first frequency resource range may be a frequency resource range planned to be allocated to the first target UE by the first base station on the target BWP in the target time period.

In Step 122, second planned scheduling-configuration information of the second base station is acquired, the second planned scheduling-configuration information including a second time-frequency resource range planned to be allocated to second target UE by the second base station on the target BWP in the target time period.

In the same manner as above, the first base station may acquire the planned scheduling-configuration information of the second base station through the preset inter-base-station interface or a preset relay platform such as the MME.

Similarly, the second time-frequency resource range may include a second time-domain resource range and a second frequency resource range. The second time-domain resource range may be a time-domain resource range planned to be allocated to the second target UE by the second base station on the target BWP in the target time period. The second frequency resource range may be a frequency resource range planned to be allocated to the second target UE by the second base station on the target BWP in the target time period.

In Step 123, whether the inter-cell interference is about to occur in the target time period or not is determined according to the first planned scheduling-configuration information and the second planned scheduling-configuration information.

In the embodiment of the present disclosure, it may be determined that the inter-cell interference is about to occur between the target UE and the base stations under any of the following conditions.

A first condition may be that: if the first frequency range at least partially overlaps with the second frequency range, it can be determined that the inter-cell interference is about to occur in the target time period.

The first condition may be applied to a situation that the first base station and the second base station plan to allocate part of frequency resources of the same BWP to the target UE in the target time period T respectively. As shown in the upper part of FIG. 4-3, whether the inter-cell interference is about to occur in the target time period or not can be rapidly and accurately judged according to whether the two frequency resource ranges overlap or not so as to provide an accurate basis for subsequent judgment in whether to adjust resource allocation or not and determination of a specific adjustment manner to be adopted.

A second condition may be that: if the first time-domain resource range t1 and the second time-domain resource range t2 meet t1+t2>T, it can be determined that the inter-cell interference is about to occur in the target time period. T is a time length of the target time period.

The second condition may be applied to a situation that the first base station and the second base station plan to allocate part of time-domain resources of the target time period to the target UE on the same BWP respectively. As shown in the upper part of FIG. 4-2, whether the inter-cell interference is about to occur in the target time period or not can be rapidly judged according to time lengths respectively corresponding to the time-domain resources of the two parts so as to provide an accurate basis for subsequent judgment on whether to adjust resource allocation or not and for determination of a specific adjustment manner to be adopted.

In Step 124, if the inter-cell interference is about to occur, the time-frequency resource range allocated to the corresponding target UE by each base station on the target BWP is adjusted to determine the reallocated time-frequency resource range.

In the embodiment of the present disclosure, the first base station may accurately judge whether the inter-cell interference is about to occur in the target time period or not according to the planned scheduling-configuration information of the first base station and the second base station. Under the circumstance of determining that the inter-cell interference is about to occur, the time-frequency resource range of the base station on at least one side may further be accurately adjusted based on the original planned scheduling-configuration information to reduce or eliminate the inter-cell interference as much as possible and effectively use time-frequency resources.

In the embodiment of the present disclosure, if inter-cell interference may occur even if the first base station and the second base station schedule the target UEs according to the present planned scheduling-configuration information, for reducing or completely avoiding the inter-cell interference between the first base station and the second base station, the time-frequency resource ranges planned to be allocated to the target UEs may be adjusted in at least three manners as below.

A first manner may be that: the first base station may dominate, namely a requirement on information transmission between the first base station and the first target UE is preferably satisfied, and the second base station may adaptively adjust its own time-frequency resource range according to the adjusted time-frequency resource range of the first base station.

Figure 6:
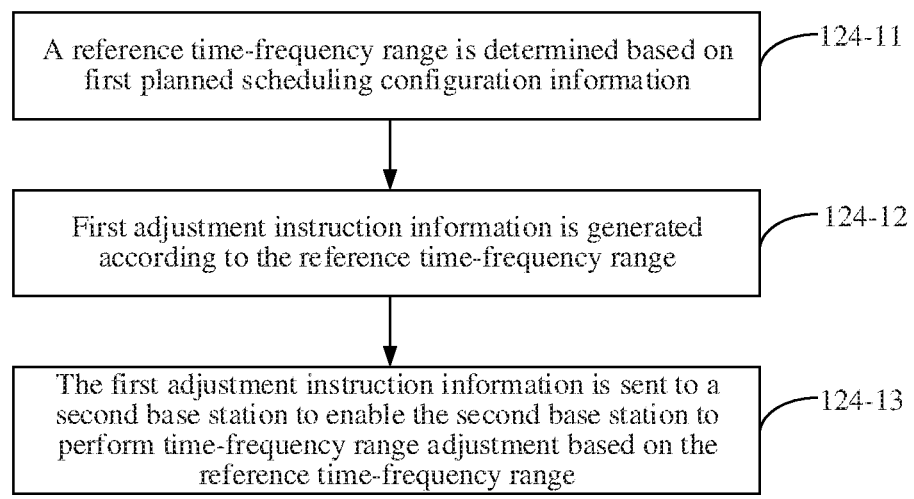
FIG. 6 is a flowchart showing another method for avoiding inter-cell interference according to an exemplary embodiment of the present disclosure.

FIG. 6 is a flowchart showing another method for avoiding inter-cell interference according to an exemplary embodiment. Step 124 may include the following operations.

In Step 124-11, a reference time-frequency range is determined based on the first planned scheduling-configuration information.

According to whether the first base station adjusts a first time-frequency resource range or not, there are two conditions as below for the reference time-frequency range determined by the first base station.

A first condition may be that: in an embodiment of the present disclosure, the first base station may adjust the first time-frequency resource range to actively reduce the time-frequency resource range allocated to the first target UE to obtain a first reallocated time-frequency resource range and then determine the first reallocated time-frequency resource range as the reference time-frequency range.

A second condition may be that: in another embodiment of the present disclosure, the first base station, when not intended to reduce the time-frequency resource range allocated to the first target UE according to a service requirement, may determine the first time-frequency resource range planned to be allocated to the first target UE as the reference time-frequency range.

In the embodiment of the present disclosure, the first base station, when dominating avoidance of the inter-cell interference, may flexibly determine whether to adjust its own resource allocation before instructing the second base station for time-frequency resource adjustment or not according to its own service transmission requirement and in combination with a reasonable resource utilization principle, to improve resource utilization reasonability.

In Step 124-12, first adjustment instruction information is generated according to the reference time-frequency range.

In the embodiment of the present disclosure, the first adjustment instruction information may include reference time-frequency range information, or may also directly include time-frequency range information determined according to the reference time-frequency range and adjusted by the second base station, for example, a complementary range of the reference time-frequency range.

The time-frequency range information in the first adjustment instruction information may be a specific time-frequency range value, an endpoint value and the like, or may also be a label configured to identify the tune-frequency range, for example, a label of a sub BWP determined after the BWP is equally divided, and/or, a label of the unit time-domain resource in the target time period, or may also be a bitmap representing the time-frequency resource range. Representing the time-frequency resource range with a label or a bitmap may occupy relatively few resources, save resources and reduce a signaling overhead.

In Step 124-13, the first adjustment instruction information is sent to the second base station to enable the second base station to perform time-frequency range adjustment based on the reference time-frequency range.

In the same manner as above, the first base station may send the first adjustment instruction information to the second base station through the preset inter-base-station interface or the relay platform such as an MME.

Correspondingly, the second base station, after receiving the first adjustment instruction information, may adjust the time-frequency resource range allocated to the second target UE completely based on the reference time-frequency range determined by the first base station to ensure effective avoidance of the inter-cell interference and effective utilization of radio resources.

Detailed descriptions will be made below in combination with a specific embodiment. There is made such a hypothesis that the two base stations in FIG. 1 plan to simultaneously schedule the target UE on BWP0 of the same frequency range respectively. There is made such a hypothesis that a bandwidth of BWP0 is 20 MHz and a specific frequency range is 3,900 MHz to 3,920 MHz. As shown in FIG. 1, the first planned scheduling-configuration information is a time-frequency resource range planned to be allocated to UE1 by the first base station 100 on BWP0 in the target time period T, and the second planned scheduling-configuration information is a time-frequency resource range planned to be allocated to UE2 by the second base station 200 on BWP0 in the target time period T.

Adjustment of time-domain resources is taken as an example. FIG. 4-2 is a schematic diagram illustrating inter-cell interference avoidance according to an exemplary embodiment. There is made such a hypothesis that the time length of the target time period T is 6 ms, the first planned scheduling-configuration information includes the first frequency resource range of 3,900 MHz, to 3,920 MHz and the first time-domain resource range of 5 ms, and the second planned scheduling-configuration information includes the second frequency resource range of 3,900 MHz to 3,920 MHz and the second time-domain resource range of 4 ms.

As shown in FIG. 4-2, there is made such a hypothesis that the first base station reduces the first time-domain resource range of 5 ms planned to be allocated to UE1 to be 4 ms and then generates the first adjustment instruction information by taking the adjusted time-domain resource range of 4 ms as reference time-domain resources. The first adjustment instruction information may include 4 ms, so as to instruct the second base station 200 to adjust the time-domain resource range allocated to UE2 according to 4 ms reallocated to UE1 by the first base station.

Or, the first adjustment instruction information may include 2 ms, so as to instruct the second base station to reduce the second time-domain resource range from 4 ms planned to be allocated to 2 ms.

In another embodiment of the present disclosure, the reallocated time-domain resource range may also be represented by a bitmap. For example, time-domain resources may be continuously allocated. In FIG. 4-2, there is made such a hypothesis that the target time period T is a time period corresponding to the unit time-domain resources labeled with 2 to 7. In a case that the unit time-domain resource labels corresponding to the 4 ms time-domain resources reallocated by the first base station are 2, 3, 4 and 5 respectively in the first condition, the first adjustment instruction information may include a time-domain resource bitmap, the time-domain resource bitmap may include totally 6 bits which map the unit time-domain resources labeled with 2 to 7 respectively, and values of the bits corresponding to the labels 2, 3, 4 and 5 may be set to be 1, for example, 111100, to represent that the first base station determines the time-domain resource range corresponding to the labels 2, 3, 4 and 5 as the reallocated time-domain resource range.

Correspondingly, the unconfigured time-domain resources represented with the labels 6 and 7 may represent that the first base station does not configure transmission of UE1 on BWP0 in the time-domain resources labeled with 6 and 7 or represent that the first base station at least does not configure data transmission of UE1 on BWP0 in the time-domain resources labeled with 6 and 7.

The second base station, after receiving the first adjustment instruction information, may determine the time-domain resources represented by a complementary bitmap such as 000011, i.e., the time-domain resources represented with the labels 6 and 7, as second reallocated time-domain resources.

In another embodiment of the present disclosure, the first adjustment instruction information may also include a time-domain resource bitmap 000011 to instruct the second base station to determine the two unit time-domain resources represented with the time-domain resource bitmap 000011 and labeled with 6 and 7 as time-domain resources reallocated to UE2.

In another embodiment of the present disclosure, for the condition that the base station discontinuously allocates the time-domain resources, the reallocated time-domain resource range can be represented more conveniently, simply and clearly by the bitmap and thus radio resources can be saved.

In addition, in the embodiment of the present disclosure, when the first base station dominates, the first base station may determine reference time-domain resources according to a preset time sequence. For example, the first four time-domain resources, i.e., the time-domain resources represented with the labels 2, 3, 4 and 5, in the target time period T including the six unit time-domain resources may be determined as first reallocated time-domain resources.

Adjustment of frequency-domain resources is taken as an example. FIG. 4-3 is another schematic diagram illustrating inter-cell interference avoidance according to an exemplary embodiment. There is still made such a hypothesis that the target BWP is BWP0 of which a bandwidth Wf is 20 MHz and a specific frequency range is 3,900 MHz to 3,920 MHz. The first planned scheduling-configuration information may include the first frequency range W10 of 3,905 MHz to 3,920 MHz and the first time-domain range of 6 ms. The second planned scheduling-configuration information may include the second frequency range W20 of 3,900 MHz to 3,915 MHz and the second time-domain range of 6 ms. 6 ms is the time length of the whole target time period T.

The first base station, after determining that the inter-cell interference is about to occur, may actively adjust the first frequency range W10 to a first reallocated frequency range W1 of 3,910 MHz to 3,920 MHz, generate the first adjustment instruction information by taking the first reallocated frequency range as a reference frequency range and send it to the second base station to enable the second base station to adjust the frequency resource range allocated to UE2 according to the reference frequency range, for example, adjusting the second frequency range W20 to a second reallocated frequency range W2.

Similarly, the base station may also represent the reallocated frequency resource range by a bitmap. As shown in FIG. 4-4, in a frequency resource reallocation process, the whole bandwidth Wf of the target BWP, i.e., BWP0, may be divided into a preset number of sub BWPs according to a preset manner. As shown in FIG. 4-4, there is made such a hypothesis that Wf is equally divided into five sub BWPs labeled with f1, f2, f3, f4 and f5 respectively.

When the first base station determines the three sub BWPs labeled with f1, f2 and f3 as the first reallocated frequency range W1, the first adjustment instruction information may include a frequency resource bitmap 10101 representing a reference frequency resource range determined by the first base station.

Similarly, the first adjustment instruction information may also include a frequency resource bitmap 01010 representing that the first base station instructs the second base station to determine the sub BWPs labeled with f2 and f4 as the second reallocated frequency range W2.

In another embodiment of the present disclosure, the first base station that dominates may determine a frequency-domain resource reallocation manner according to its own workload condition in a frequency resource reallocation process.

For example, the first base station may determine a ratio of a downlink service to an uplink service between the first base station and UE1 according to a downlink buffer status or an uplink Buffer Status Report (BSR) of UE1; when the downlink service is more, a high-frequency range may be preferably configured; and on the contrary, if the uplink service is more, a relatively low-frequency range may be preferably configured.

The above is the condition that the first base station, after actively adjusts the first time-frequency resource range, sends the first adjustment instruction information.

Corresponding to the second condition, in another embodiment of the present disclosure, the first base station may also generate the first adjustment instruction information directly by taking the first time-frequency resource range as the reference time-frequency range without adjusting the present first time-frequency resource range, to further instruct the second base station to perform adaptive adjustment according to the reference time-frequency range determined by the first base station.

In the embodiment of the present disclosure, the first base station may dominate adjustment of the time-frequency resource range to facilitate centralized control and effective utilization of radio resources in an application scenario that the first base station is a macro base station and the second base station is a micro base station. The embodiment is particularly applicable to an application scenario where there are multiple second base stations which may simultaneously have inter-cell interference with the first base station, therefore, repeated adjustment of the time-frequency resource range of each base station for resource allocation balance can be avoided, the efficiency of time-frequency resource adjustment can be improved, and inter-cell interference can be further efficiently avoided.

A second manner is that: the second base station dominates, namely a requirement on information transmission between the second base station and the second target UE is preferably satisfied, and the first base station adaptively adjusts its own time-frequency resource range according to the adjusted time frequency resource range of the second base station.

Figure 7:
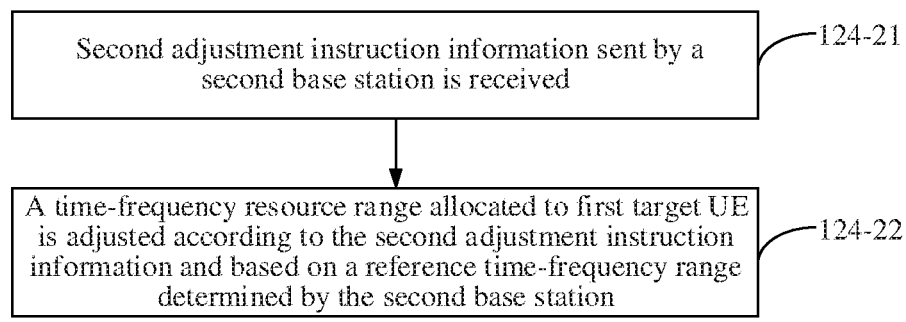
FIG. 7 is a flowchart showing another method for avoiding inter-cell interference according to an exemplary embodiment of the present disclosure.

FIG. 7 is a flowchart showing another method for avoiding inter-cell interference according to an exemplary embodiment. Step 124 may include the following operations.

In Step 124-21, second adjustment instruction information sent by the second base station is received.

In the present disclosure, the second adjustment instruction information may instruct the first base station to adaptively adjust its own first time-frequency resource range according to a reference time-frequency range determined by the second base station. The second adjustment instruction information may be generated by the second base station. A way the second base station generates the second adjustment instruction information may be similar to the way the first base station generates the first adjustment instruction information. The elaborations thereof are omitted herein.

Similar to the first condition and the second condition, depending on whether the second base station performs active adjustment or not when the reference time-frequency range is determined based on the second time-frequency resource range, the reference time-frequency range determined by the second base station may include a second reallocated time-frequency resource range determined after the second base station adjusts the second time-frequency resource range, or, may include the second time-frequency resource range.

In the embodiment of the present disclosure, the second base station, when dominating avoidance of the inter-cell interference, may also flexibly determine whether to adjust its own resource allocation before instructing the first base station for time-frequency resource adjustment or not according to its own service transmission requirement and in combination with the reasonable resource utilization principle, to improve the resource utilization reasonability.

In Step 124-22, the time-frequency resource range allocated to the first target UE is adjusted according to the second adjustment instruction information and based on a reference time-frequency range determined by the second base station.

In the embodiment of the present disclosure, the first base station, when adjusting the first time-frequency resource range, performs adjustment based on the reference time-frequency range determined by the second base station.

Similarly, according to different information in the second adjustment instruction information, Step 124-22 may include the following implementation modes.

A first implementation mode is that: when the second adjustment instruction information includes reference time-frequency range information determined by the second base station, the first base station may adjust the first time-frequency range based on the reference time-frequency range information to obtain the first reallocated time-frequency resource range to ensure that the first reallocated time-frequency resource range less overlaps with the reference time-frequency range determined by the second base station in a time-frequency range of the target BWP, and the two ranges are preferably complementary to each other.

A second implementation mode is that: when the second adjustment instruction information includes time-frequency range information determined by the second base station according to the reference time-frequency range and instructed to be adjusted by the first base station and when the first base station completely follows the adjustment instruction of the second base station, the first base station may perform adjustment completely according to the time-frequency range information instructed by the second base station.

In the embodiment of the present disclosure, time-frequency resource range adjustment dominated by the second base station is applicable to an application scenario where traffic of the second base station is relatively high and the guarantee of services is a main purpose. There is still made such a hypothesis that the second base station is a micro base station, the first base station is a macro base station and traffic of the second base station may be higher than that of the macro base station. For example, the second base station is a micro base station arranged in a stadium. At present, hot spot coverage of the stadium is required to be ensured. During adjustment for inter-cell interference avoidance, time-frequency resource range adjustment dominated by the second base station may be performed, thereby preferentially ensuring service transmission quality of the second base station and improving intelligence of the base stations in the 5G NR system.

A third manner is that: the first base station and the second base station perform time-frequency resource range adjustment according to a preset adjustment manner respectively.

For example, the preset adjustment manner may be reducing the time-frequency resource ranges planned to be allocated respectively when the inter-cell interference may occur so as to ensure that the reallocated time-frequency resource ranges obtained by adjustment are complementary in the range of the target BWP.

Adjustment of the time-domain resources is taken as an example. The first base station and the second base station may predetermine a certain resource adjustment manner, for example, a compromised adjustment manner. FIG. 4-5 is another schematic diagram illustrating inter-cell interference avoidance according to an exemplary embodiment. After the first base station determines that the inter-cell interference is about to occur, the first base station may reduce the first time-domain resource range of 5 ms to 3 ms according to the compromised adjustment manner. Meanwhile, the second base station may also automatically reduce the second time-domain resource range of 4 ms to 3 ms according to the preset adjustment manner. Therefore, the time-domain resource ranges of the two are complementary in the target time period T.

In the embodiment of the present disclosure, no adjustment instruction information is required to be sent between the first base station and the second base station, and the time-frequency resource ranges may be automatically adjusted according to the preset adjustment manner, so that the control signaling overhead may be reduced, and an interaction delay may be reduced.

Such a process is a process that the first base station determines the reallocated time-frequency resource range allocated to the first target UE under the circumstance of determining that the inter-cell interference is about to occur.

In Step 13, target scheduling-configuration information for avoiding the inter-cell interference is determined according to the reallocated time-frequency resource range.

After each base station adjusts the time-frequency resource range, the first base station may determine the target scheduling-configuration information according to the reallocated time-frequency resource range in any one of the following manners.

A first manner is that: the target scheduling-configuration information is determined according to the reallocated time-frequency resource range determined after adjustment according to the abovementioned three manners.

A second manner is that: the first base station, after adjustment is made according to any one of the abovementioned manners, may further send the reallocated time-frequency resource range to the second base station to query whether the second base station supports a present adjustment result or not; if the second base station does not support, the first base station and the second base station may adjust the time-frequency resource ranges again according to any one of the abovementioned manners until the second base station supports the adjustment result of the first base station, and the target scheduling-configuration information may be determined according to the reallocated time-frequency resource range supported by the second base station.

Figure 8:
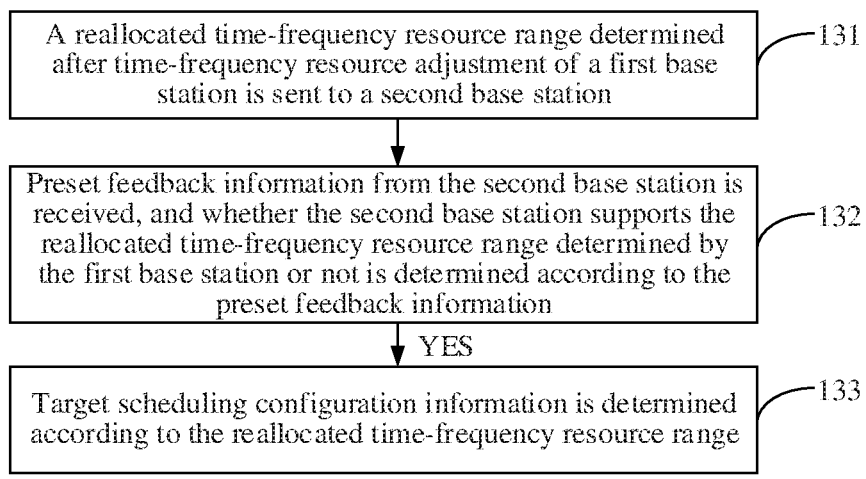
FIG. 8 is a flowchart showing another method for avoiding inter-cell interference according to an exemplary embodiment of the present disclosure.

FIG. 8 is a flowchart showing another method for avoiding inter-cell interference according to an exemplary embodiment. Step 13 may include the following operations.

In Step 131, the reallocated time-frequency resource range, determined through a time-frequency resource adjustment by the first base station, is sent to the second base station.

Corresponding to each of the abovementioned embodiments, the reallocated time-frequency resource range determined by the first base station may be the reference time-frequency range determined in Step 124-11 or may also be the time-frequency resource range obtained after adjustment in Step 124-22 or a reallocated time-frequency resource range re-determined by the first base station after repeated adjustment of the time-frequency resource range. In Step 132, preset feedback information is received from the second base station, and whether the second base station supports the reallocated time-frequency resource range determined by the first base station or not is determined according to the preset feedback information.

In the present disclosure, the preset feedback information may indicate whether the second base station supports the reallocated time-frequency resource range determined by the first base station or not. The preset feedback information may include positive feedback information representing support and negative feedback information representing non-support.

In Step 133, in a case that the preset feedback information indicates that the second base station supports the reallocated time-frequency resource range determined by the first base station, the target scheduling-configuration information is determined according to the reallocated time-frequency resource range.

That is, the first base station, upon when receiving the positive feedback information of the second base station, may generate the target scheduling-configuration information for the first target UE according to the presently determined reallocated time-frequency resource range. The target scheduling-configuration information may include the time-frequency resource range for scheduling the first target UE by the first base station.

On the contrary, in a case that the preset feedback information indicates that the second base station does not support the reallocated time-frequency resource range of the first base station. Step 124 may be repeatedly executed according to any one of the abovementioned manners to adjust the time-frequency resource range allocated to the first target UE by the first base station again and query whether the second base station supports an adjustment solution of the first base station or not again until the second base station supports the adjustment result of the first base station.

In the embodiment of the present disclosure, the first base station may send the reallocated time-frequency resource range obtained after adjustment to the second base station for confirmation, so that inconsistency in protocol explanations of each base station may be avoided. For example, when the third manner is adopted for adjustment, such as for time-domain adjustment, if the target time period includes 7 unit time-domain resources, 3.5 unit time-domain resources are to be allocated respectively according to the preset compromised adjustment manner. If it is specified in a protocol that, under such a circumstance, the first base station may allocate 3 unit time-domain resources and the second base station may allocate 4 unit time-domain resources, due to inconsistent explanations of the two protocols, the time-domain resources reallocated by the first base station are also 4 unit time-domain resources, and consequently, the adjusted time-frequency resource range may still cause inter-cell interference and cannot completely eliminate inter-cell interference. Under such a circumstance, if the first base station sends the reallocated time-domain resource range to the second base station for advanced confirmation, the second base station may find this problem and thus subsequently feed information back to the first base station to notify the first base station to adjust the resource range again or adaptively adjust its own resource range again to prevent occurrence of this circumstance in advance and ensure effective avoidance of the inter-cell interference.

In Step 14, the first target UE is scheduled on the target BWP according to the target scheduling-configuration information.

Figure 9:
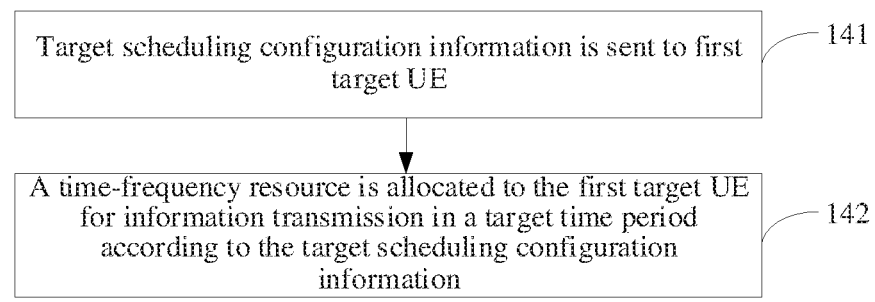
FIG. 9 is a flowchart showing another method for avoiding inter-cell interference according to an exemplary embodiment of the present disclosure.

FIG. 9 is a flowchart showing another method for avoiding inter-cell interference according to an exemplary embodiment. Step 14 may include the following operations.

In Step 141, the target scheduling-configuration information is sent to the first target UE.

The first target UE, after receiving the target scheduling-configuration information, may perform transmission configuration according to the time-frequency resource range reallocated by the first base station. For example, before arrival of the target time period T, a working frequency range may be adjusted to the reallocated frequency resource range.

In the present disclosure, the first base station may transmit the target scheduling-configuration information to the first target UE through broadcast signaling, upper-layer signaling or physical-layer Physical Downlink Control Channel (PDCCH) signaling. The upper-layer signaling may be Radio Resource Control (RRC) signaling and Medium Access Control (MAC) Control Element (CE) signaling.

In Step 142, a time-frequency resource is allocated to the first target UE for information transmission in the target time period according to the target scheduling-configuration information.

For example, in FIG. 4-3, the first base station schedules the first target UE on the reallocated frequency range W1 in the target time period T to implement uplink and downlink information transmission between the first base station and the first target UE.

Meanwhile, the second base station may schedule the second target UE on the frequency range W2 of BWP0 to implement uplink and downlink information transmission between the second base station and the second target UE.

Since information transmission between the first base station and the first target UE and information transmission between the second base station and the second target UE are performed on different frequency ranges of the same BWP, the inter-cell interference can be effectively avoided.

In another embodiment of the present disclosure, the target scheduling-configuration information may further include reallocated time-frequency resource ranges corresponding to different time ranges in the target time period and determined according to different adjustment manners, and the different adjustment manners may include a frequency adjustment manner and a time-domain adjustment manner.

That is, in some scenarios, according to the present disclosure, the time-frequency resource range may further be adjusted in the target time period T by combining frequency adjustment and time-domain adjustment to avoid inter-cell interference. For example, in a certain application scenario, the target time period T may be divided into two time ranges T1 and T2 according to a practical service requirement. In the time range T1, the first base station may determine first scheduling-configuration information in the time-domain regulation manner. In the time range T2, the first base station may determine second scheduling-configuration information in the frequency regulation manner.

Correspondingly, the first target UE may perform transmission configuration twice or for many times in the target time period according to the scheduling-configuration information for adaptation to the dine-frequency resource adjustment manners in different time ranges.

Then, an implementation mode of Step 142 is as follows: in a time range T1 in the target time period T, the first base station may allocate the time-frequency resource to the first target UE for information transmission according to the first scheduling-configuration information; and in another time range T2 in the target time period T, the first base station may allocate the time-frequency resource to the first target UE for information transmission according to the second scheduling-configuration information.

According to the present disclosure, a strategy of combining different adjustment manners is adopted, so that the adjustment manners may be flexibly adopted for BWP-based enhancement of inter-cell interference avoidance of the base station. Above all, with adoption of the method for avoiding inter-cell interference provided in the present disclosure, when adjacent base stations plan to schedule UEs at edges of adjacent cells on a target BWP of the same frequency range, for reducing or eliminating inter-cell interference, a target time period when inter-cell interference may occur may be determined, then a time-frequency resource range allocated to a target UE individually by the base stations based on the target BWP in the target time period may be adjusted, target scheduling-configuration information for avoiding the inter-cell interference may be determined according to the adjusted time-frequency resource range, then the target scheduling-configuration information may be sent to the corresponding target UE for transmission configuration of the target UE, and after the target UE completes transmission configuration, the first base station may allocate a time-frequency resource to the first target UE for information transmission on the target BWP according to the scheduling-configuration information for the first target UE. Since overlapping of a time-domain resource range or frequency resource range allocated to the target UE individually by base stations is avoided as much as possible in a time-frequency resource range adjustment process, when the target UEs at the edges of the adjacent cells transmit information by use of different time-frequency resources in the same target BWP, the inter-cell interference can be effectively reduced or eliminated, communication quality and performance of the UEs at the edges of the cells can be improved, and a user experience of a 5G network device can be improved.

It is to be noted here that the second base station may adopt the same method to avoid inter-cell interference, and implementation of the method on the side of the second base station may refer to an implementation process of the first base station.

For simple description, each of the abovementioned method embodiments is expressed as a combination of a series of operations, but those skilled in the art should understand that the present disclosure is not limited to the described operation sequence because some steps may be executed in other sequences or at the same time according to the present disclosure.

Second, those skilled in the art should also understand that all the embodiments described in the specification are optional embodiments and involved operations and modules are not always required by the present disclosure.

Corresponding to the abovementioned application function realization method embodiments, the present disclosure also provides embodiments of a device and a corresponding terminal for realization of application functions.

Figure 10:
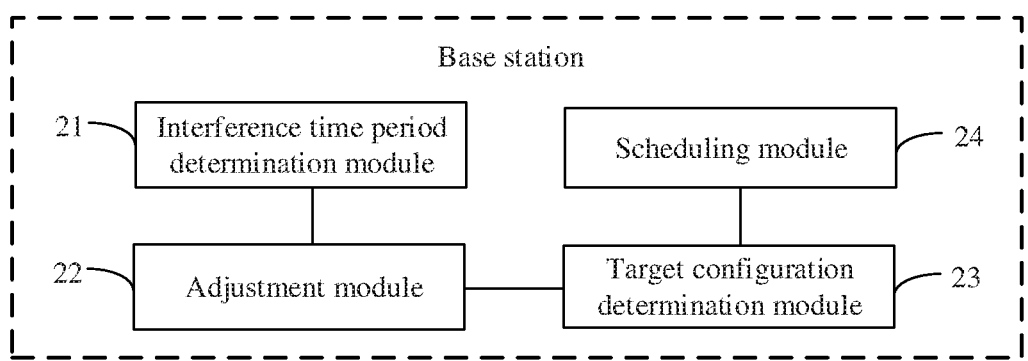
FIG. 10 is a device block diagram of a base station according to an exemplary embodiment of the present disclosure.

FIG. 10 is a device block diagram of a base station according to an exemplary embodiment. The base station may include:

an interference time period determination module 21, configured to determine a target time period when the inter-cell interference may occur;

an adjustment module 22, configured to adjust a time-frequency resource range allocated to a target UE individually by base stations based on a target BWP in the target time period to determine a reallocated time-frequency resource range, the base stations including a first base station and a second base station involved in the inter-cell interference, and the second base station being adjacent to the first base station;

a target configuration determination module 23, configured to determine target scheduling-configuration information for avoiding the inter-cell interference according to the reallocated time-frequency resource range; and a scheduling module 24, configured to schedule first target UE on the target BWP according to the target scheduling-configuration information.

Figure 11:
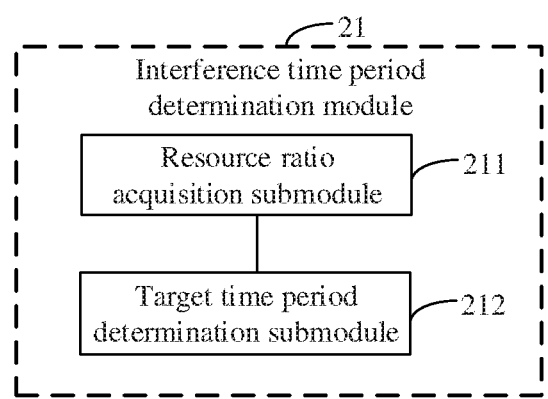
FIG. 11 is a device block diagram of another base station according to an exemplary embodiment of the present disclosure.

FIG. 11 is a device block diagram of another base station according to an exemplary embodiment. Based on the device embodiment shown in FIG. 10, the interference time period determination module 21 may include:

a resource ratio acquisition submodule 211, configured to acquire uplink-to-downlink time-domain resource ratio information of the second base station in a TDD mode; and a target time period determination submodule 212, configured to determine the target time period when the inter-cell interference may occur according to uplink-to-downlink time-domain resource ratio information of the first base station and the uplink-to-downlink time-domain resource ratio information of the second base station in the TDD mode.

Figure 12:
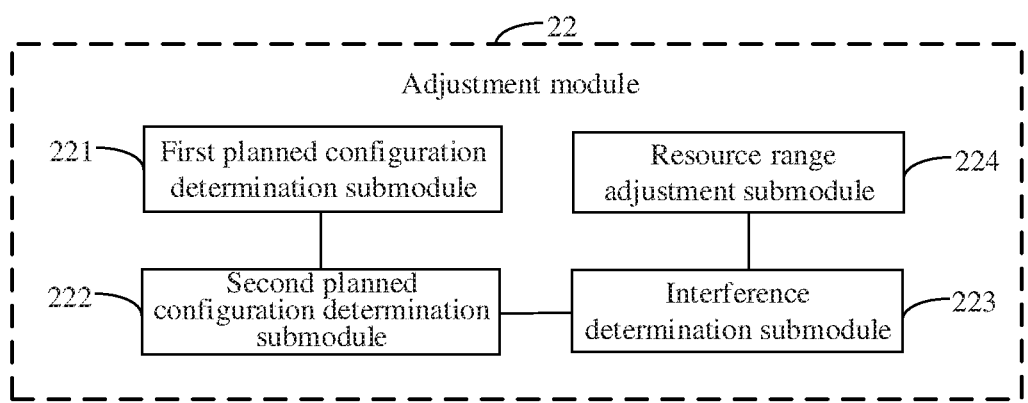
FIG. 12 is a device block diagram of another base station according to an exemplary embodiment of the present disclosure.

FIG. 12 is a device block diagram of another base station according to an exemplary embodiment. Based on the device embodiment shown in FIG. 10, the adjustment module 22 may include:

a first planned configuration determination submodule 221, configured to determine first planned scheduling-configuration information of the first base station, the first planned scheduling-configuration information including a first time-frequency resource range planned to be allocated to the first target UE by the first base station on the target BWP in the target time period;

a second planned configuration determination submodule 222, configured to acquire second planned scheduling-configuration information of the second base station, the second planned scheduling-configuration information including a second time-frequency resource range planned to be allocated to second target UE by the second base station on the target BWP in the target time period;

an interference determination submodule 223, configured to determine whether the inter-cell interference is about to occur in the target time period or not according to the first planned scheduling-configuration information and the second planned scheduling-configuration information; and a resource range adjustment submodule 224, configured to, under the circumstance that the inter-cell interference is about to occur, adjust the time-frequency resource range allocated individually by the base stations on the target BWP to the corresponding target UE to determine the reallocated time-frequency resource range.

In an embodiment of the base station of the present disclosure, the first time-frequency resource range determined by the first planned configuration determination submodule 221 may include a first frequency resource range and a first time-domain resource range, and the second time-frequency resource range determined by the second planned configuration determination submodule 222 may include a second frequency resource range and a second time-domain resource range.

Figure 13:
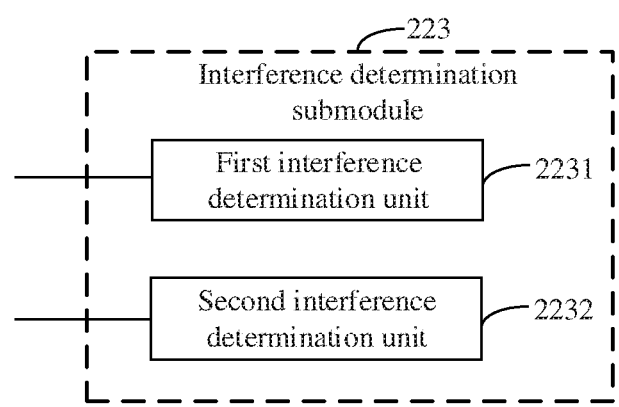
FIG. 13 is a device block diagram of another base station according to an exemplary embodiment of the present disclosure.

FIG. 13 is a device block diagram of another base station according to an exemplary embodiment. Based on the device embodiment shown in FIG. 12, the interference determination submodule 223 may include any one of the following units:

a first interference determination unit 2231, configured to, in a case that the first frequency resource range allocated to the first target UE by the first base station on the target BWP partially overlaps the second frequency resource range allocated to the second target UE by the second base station on the target BWP, determine that the inter-cell interference is about to occur in the target time period; and a second interference determination module 2232, configured to, in a case that the first time-domain resource range t1 allocated to the first target UE by the first base station in a preset frequency range of the target BWP and the second time-domain resource range t2 allocated to the second UE by the second base station in the same frequency range of the target BWP meet t1+t2>T, T being a time length of the target time period, determine that the inter-cell interference is about to occur in the target time period.

Figure 14:
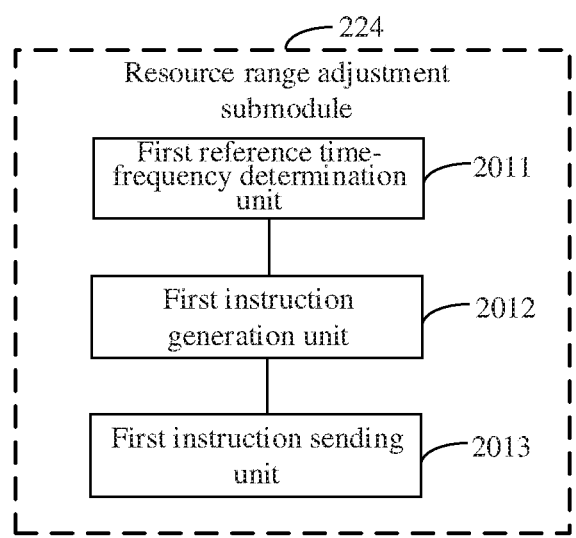
FIG. 14 is a device block diagram of another base station according to an exemplary embodiment of the present disclosure.

FIG. 14 is a device block diagram of another base station according to an exemplary embodiment. Based on the device embodiment shown in FIG. 12, the resource range adjustment submodule 224 may include:

a first reference time-frequency determination unit 2011, configured to determine a reference time-frequency range based on the first planned scheduling-configuration information;

a first instruction generation unit 2012, configured to generate first adjustment instruction information according to the reference time-frequency range; and a first instruction sending unit 2013, configured to send the first adjustment instruction information to the second base station to enable the second base station to perform time-frequency range adjustment based on the reference time-frequency range.

Figure 15:
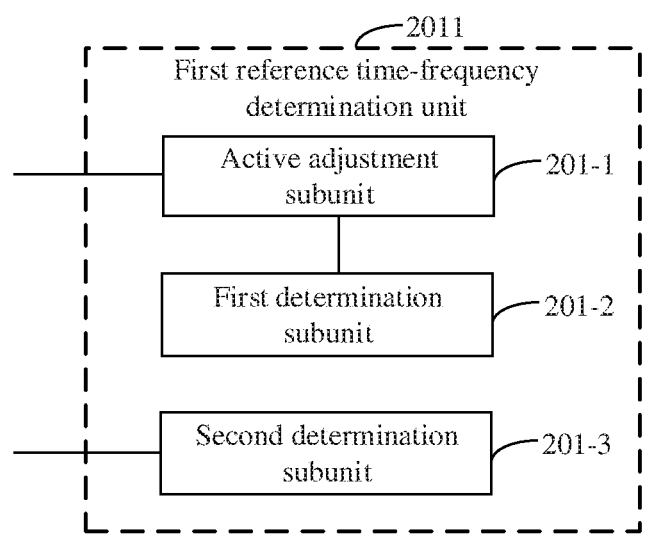
FIG. 15 is a device block diagram of another base station according to an exemplary embodiment of the present disclosure.

FIG. 15 is a device block diagram of another base station according to an exemplary embodiment. Based on the device embodiment shown in FIG. 14, the first reference time-frequency determination unit 2011 may include:

an active adjustment subunit 201-1, configured to adjust the first time-frequency resource range to obtain a first reallocated time-frequency resource range and a first determination subunit 201-2, configured to determine the first reallocated time-frequency resource range as the reference time-frequency range; or, a second determination subunit 201-3, configured to determine the first time-frequency resource range as the reference time-frequency range.

Figure 16:
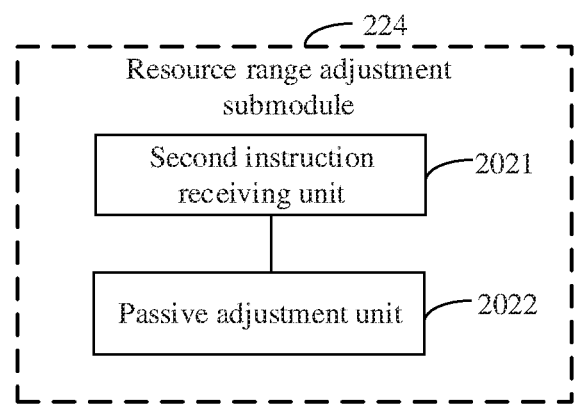
FIG. 16 is a device block diagram of another base station according to an exemplary embodiment of the present disclosure.

FIG. 16 is a device block diagram of another base station according to an exemplary embodiment. Based on the device embodiment shown in FIG. 12, the resource range adjustment submodule 224 may include:

a second instruction receiving unit 2021, configured to receive second adjustment instruction information from the second base station; and a passive adjustment unit 2022, configured to adjust the time-frequency resource range allocated to the first target UE according to the second adjustment instruction information and based on a reference time-frequency range determined by the second base station.

The reference time-frequency range determined by the second base station may include: the second time-frequency resource range; or, a second reallocated time-frequency resource range determined after the second base station adjusts the second time-frequency resource range.

In another base station embodiment of the present disclosure, the resource range adjustment submodule 224 may further be configured to adjust the first time-frequency resource range according to a preset adjustment manner to obtain the reallocated time-frequency resource range.

In another base station embodiment of the present disclosure, the first base station, before determining the target scheduling-configuration information, may further send the reallocated time-frequency resource range obtained after adjustment to the second base station to query whether the second base station supports the reallocated time-frequency resource range determined by the first base station or not.

Figure 17:
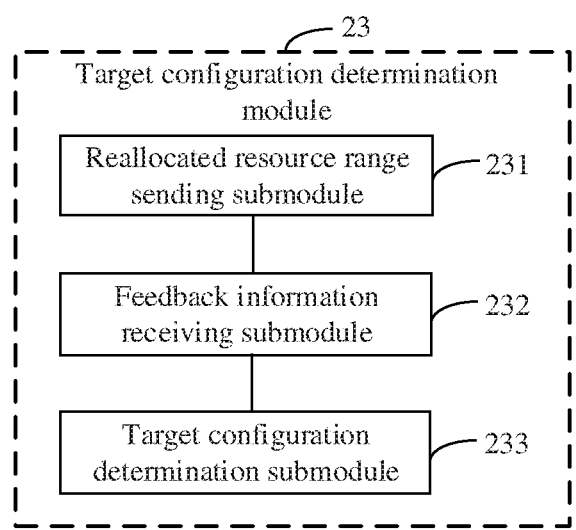
FIG. 17 is a device block diagram of another base station according to an exemplary embodiment of the present disclosure.

FIG. 17 is a device block diagram of another base station according to an exemplary embodiment. Based on the base station embodiment shown in FIG. 10, the target configuration determination module 23 may include:

a reallocated resource range sending submodule 231, configured to send the reallocated time-frequency resource range, determined through a time-frequency resource adjustment by the first base station, to the second base station;

a feedback information receiving submodule 232, configured to receive preset feedback information from the second base station, the preset feedback information indicating whether the second base station supports the reallocated time-frequency resource range determined by the first base station or not; and a target configuration determination submodule 233, configured to, in a case that the preset feedback information indicates that the second base station supports the reallocated time-frequency resource range determined by the first base station, determine the target scheduling-configuration information according to the reallocated time-frequency resource range.

In another base station embodiment of the present disclosure, the target scheduling-configuration information determined by the target configuration determination module 23 may include reallocated time-frequency resource ranges corresponding to different time ranges in the target time period and determined according to different adjustment manners, and the different adjustment manners may include a frequency adjustment manner and a tune-domain adjustment manner.

The device embodiments substantially correspond to the method embodiments, and thus related parts refer to part of descriptions of the method embodiments. The device embodiments described above are only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the present disclosure. Those of ordinary skill in the art may understand and implement without creative work.

Correspondingly, the present disclosure also provides a base station, which includes: a processor; and a memory configured to store an instruction executable by the processor. The processor is configured to:

determine a target time period when inter-cell interference may occur;

adjust a time-frequency resource range allocated to target UE individually by base stations based on a target. BWP in the target time period to determine a reallocated time-frequency resource range, the base stations including a first base station and second base station involved in the inter-cell interference and the second base station being adjacent to the first base station;

determine target scheduling-configuration information for avoiding the inter-cell interference according to the reallocated time-frequency resource range; and schedule first target UE on the target BWP according to the target scheduling-configuration information.

Figure 18:
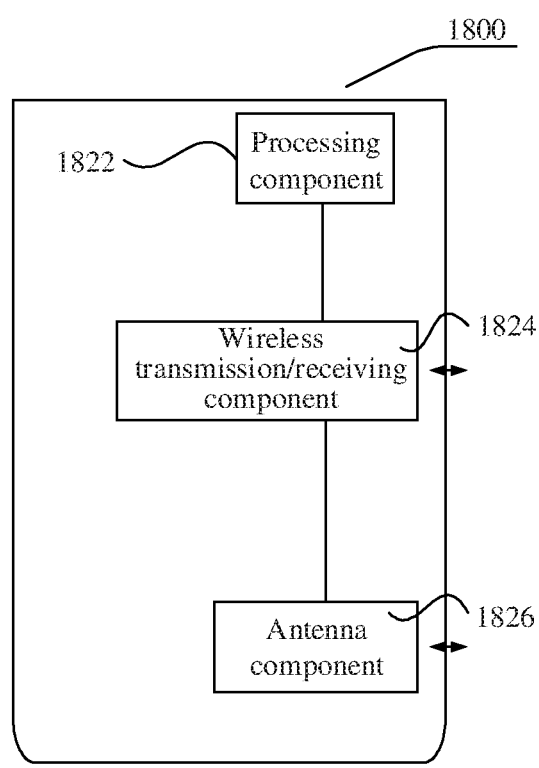
FIG. 18 is a structure diagram of a base station according to an exemplary embodiment of the present disclosure.

As shown in FIG. 18, FIG. 18 is a structure diagram of a base station 1800 according to an exemplary embodiment. Referring to FIG. 18, the base station 1800 includes a processing component 1822, a wireless transmission/receiving component 1824, an antenna component 1826 and a wireless interface-specific signal processing part, and the processing component 1822 may further include one or more processors.

One processor in the processing component 1822 may be configured to:

determine a target time period when inter-cell interference may occur;

adjust a time-frequency resource range allocated to target UE individually by base stations based on a target BWP in the target time period to determine a reallocated time-frequency resource range, the base stations including a first base station and second base station involved in the inter-cell interference and the second base station being adjacent to the first base station;

determine target scheduling-configuration information for avoiding the inter-cell interference according to the reallocated time-frequency resource range; and schedule first target UE on the target BWP according to the target scheduling-configuration information.

In an exemplary embodiment, there is also provided a non-transitory computer-readable storage medium including an instruction, in which a computer instruction is stored, and the computer instruction may be executed by the processing component 1822 of the base station 1800 to implement the method for avoiding inter-cell interference as shown in any one of FIGS. 2-9. For example, the non-transitory computer-readable storage medium may be a Read-Only Memory (ROM), a Random Access Memory (RAM), a Compact Disc Read-Only Memory (CD-ROM), a magnetic tape, a floppy disc, an optical data storage device and the like.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claim.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for avoiding inter-cell interference, applied to a first base station, the method comprising:

determining a target time period when inter-cell interference may occur;

adjusting a time-frequency resource range allocated individually by base stations based on a target band width part (BWP) to target user equipment (UE) in the target time period to determine a reallocated time-frequency resource range, wherein the base stations comprise the first base station and a second base station involved in the inter-cell interference, and the second base station is adjacent to the first base station;

determining target scheduling-configuration information for avoiding the inter-cell interference according to the reallocated time-frequency resource range; and scheduling first target UE on the target BWP according to the target scheduling-configuration information.

2. The method of claim 1, wherein determining the target time period when the inter-cell interference may occur comprises:

acquiring uplink-to-downlink time-domain resource ratio information of the second base station in a Time Division Duplexing (TDD) mode; and determining the target time period when the inter-cell interference may occur according to uplink-to-downlink time-domain resource ratio information of the first base station and the uplink-to-downlink time-domain resource ratio information of the second base station in the TDD mode.

3. The method of claim 2, wherein adjusting the time-frequency resource range allocated individually by the base stations based on the target BWP to the target UE in the target time period to determine the reallocated time-frequency resource range comprises:

determining first planned scheduling-configuration information of the first base station, wherein the first planned scheduling-configuration information comprises a first time-frequency resource range planned to be allocated to the first target UE by the first base station on the target BWP in the target time period;

acquiring second planned scheduling-configuration information of the second base station, wherein the second planned scheduling-configuration information comprises a second time-frequency resource range planned to be allocated to second target UE by the second base station on the target BWP in the target time period;

determining whether the inter-cell interference is about to occur in the target time period or not according to the first planned scheduling-configuration information and the second planned scheduling-configuration information; and under a circumstance that the inter-cell interference is about to occur, adjusting the time-frequency resource range allocated individually by the base stations on the target BWP to the corresponding target UE to determine the reallocated time-frequency resource range.

4. The method of claim 3, wherein the first time-frequency resource range comprises a first frequency resource range and a first time-domain resource range, the second time-frequency resource range comprises a second frequency resource range and a second time-domain resource range, and determining whether the inter-cell interference is about to occur in the target time period or not according to the first planned scheduling-configuration information and the second planned scheduling-configuration information comprises any one of:

in a case that the first frequency resource range allocated to the first target UE by the first base station on the target BWP partially overlaps the second frequency resource range allocated to the second target UE by the second base station on the target BWP, determining that the inter-cell interference is about to occur in the target time period; and in a case that the first time-domain resource range t1 allocated to the first target UE by the first base station in a preset frequency range of the target BWP and the second time-domain resource range t2 allocated to the second UE by the second base station in the same frequency range of the target BWP meet t1+t2>T, wherein T is a time length of the target time period, determining that the inter-cell interference is about to occur in the target time period.

5. The method of claim 3, wherein adjusting the time-frequency resource range allocated individually by the base stations on the target BWP to the corresponding target UE comprises:

determining a reference time-frequency range based on the first planned scheduling-configuration information;
generating first adjustment instruction information according to the reference time-frequency range; and
sending the first adjustment instruction information to the second base station to enable the second base station to perform time-frequency range adjustment based on the reference time-frequency range.

6. The method of claim 5, wherein determining the reference time-frequency range based on the first planned scheduling-configuration information comprises one of:
adjusting the first time-frequency resource range to obtain a first reallocated time-frequency resource range and determining the first reallocated time-frequency resource range as the reference time-frequency range; or
determining the first time-frequency resource range as the reference time-frequency range.

7. The method of claim 3, wherein adjusting the time-frequency resource range allocated individually by the base stations on the target BWP to the corresponding target UE comprises:
receiving second adjustment instruction information from the second base station; and
adjusting the time-frequency resource range allocated to the first target UE according to the second adjustment instruction information and based on a reference time-frequency range determined by the second base station.

8. The method of claim 7, wherein the reference time-frequency range determined by the second base station comprises:
the second time-frequency resource range; or,
a second reallocated time-frequency resource range determined after the second base station adjusts the second time-frequency resource range.

9. The method of claim 3, wherein adjusting the time-frequency resource range allocated individually by the base stations on the target BWP to the corresponding target UE comprises:
adjusting the first time-frequency resource range according to a preset adjustment manner to obtain the reallocated time-frequency resource range.

10. The method of claim 1, wherein determining the target scheduling-configuration information for avoiding the inter-cell interference according to the reallocated time-frequency resource range comprises:
sending the reallocated time-frequency resource range, determined through a time-frequency resource adjustment by the first base station, to the second base station;
receiving preset feedback information from the second base station, wherein the preset feedback information indicates whether the second base station supports the reallocated time-frequency resource range determined by the first base station or not; and
determining the target scheduling-configuration information according to the reallocated time-frequency resource range, in a case that the preset feedback information indicates that the second base station supports the reallocated time-frequency resource range determined by the first base station.

11. The method of claim 1, wherein the target scheduling-configuration information comprises reallocated time-frequency resource ranges corresponding to different time ranges in the target time period and determined according to different adjustment manners, and the different adjustment manners comprise a frequency adjustment manner and a time-domain adjustment manner.

12. A first base station comprising:
a processor; and
a memory storing an instruction executable by the processor;
wherein the processor is configured to:
determine a target time period when inter-cell interference may occur;
adjust a time-frequency resource range allocated individually by base stations based on a target band width part (BWP) to target user equipment (UE) in the target time period to determine a reallocated time-frequency resource range, wherein the base stations comprise the first base station and a second base station involved in the inter-cell interference, and the second base station is adjacent to the first base station;
determine target scheduling-configuration information for avoiding the inter-cell interference according to the reallocated time-frequency resource range; and
schedule first target UE on the target BWP according to the target scheduling-configuration information.

13. The first base station of claim 12, wherein the processor is further configured to:
acquire uplink-to-downlink time-domain resource ratio information of the second base station in a Time Division Duplexing (TDD) mode; and
determine the target time period when the inter-cell interference may occur according to uplink-to-downlink time-domain resource ratio information of the first base station and the uplink-to-downlink time-domain resource ratio information of the second base station in the TDD mode.

14. The first base station of claim 13, wherein the processor is further configured to:
determine first planned scheduling-configuration information of the first base station, wherein the first planned scheduling-configuration information comprises a first time-frequency resource range planned to be allocated to the first target UE by the first base station on the target BWP in the target time period;
acquire second planned scheduling-configuration information of the second base station, wherein the second planned scheduling-configuration information comprises a second time-frequency resource range planned to be allocated to second target UE by the second base station on the target BWP in the target time period;
determine whether the inter-cell interference is about to occur in the target time period or not according to the first planned scheduling-configuration information and the second planned scheduling-configuration information; and
under a circumstance that the inter-cell interference is about to occur, adjust the time-frequency resource range allocated individually by the base stations on the target BWP to the corresponding target UE to determine the reallocated time-frequency resource range.

15. The first base station of claim 14, wherein the first time-frequency resource range comprises a first frequency resource range and a first time-domain resource range, the second time-frequency resource range comprises a second frequency resource range and a second time-domain resource range, and
the processor is further configured to:
determine that the inter-cell interference is about to occur in the target time period, in a case that the first frequency resource range allocated to the first target UE by the first base station on the target BWP partially overlaps the second frequency resource range allocated to the second target UE by the second base station on the target BWP; and determine that the inter-cell interference is about to occur in the target time period, in a case that the first time-domain resource range t1 allocated to the first target UE by the first base station in a preset frequency range of the target BWP and the second time-domain resource range t2 allocated to the second UE by the second base station in the same frequency range of the target BWP meet t1+t2>T, wherein T is a time length of the target time period.

16. The first base station of claim 14, wherein the processor is further configured to:

determine a reference time-frequency range based on the first planned scheduling-configuration information;

generate first adjustment instruction information according to the reference time-frequency range; and send the first adjustment instruction information to the second base station to enable the second base station to perform time-frequency range adjustment based on the reference time-frequency range.

17. The first base station of claim 16, wherein the processor is further configured to perform one of:

adjusting the first time-frequency resource range to obtain a first reallocated time-frequency resource range and determining the first reallocated time-frequency resource range as the reference time-frequency range; or determining the first time-frequency resource range as the reference time-frequency range.

18. The first base station of claim 14, wherein the processor is further configured to:

receive second adjustment instruction information from the second base station; and adjust, according to the second adjustment instruction information and based on a reference time-frequency range determined by the second base station, the time-frequency resource range allocated to the first target UE.

19. The first base station of claim 14, wherein the processor is further configured to adjust the first time-frequency resource range according to a preset adjustment manner to obtain the reallocated time-frequency resource range.

20. The first base station of claim 12, wherein the processor is further configured to:

send the reallocated time-frequency resource range, determined through a time-frequency resource adjustment by the first base station, to the second base station;

receive preset feedback information from the second base station, wherein the preset feedback information indicates whether the second base station supports the reallocated time-frequency resource range determined by the first base station or not; and in a case that the preset feedback information indicates that the second base station supports the reallocated time-frequency resource range determined by the first base station, determine the target scheduling-configuration information according to the reallocated time-frequency resource range.

* * * * *